(12) United States Patent
Kim et al.

(10) Patent No.: US 9,910,322 B2
(45) Date of Patent: Mar. 6, 2018

(54) LIQUID CRYSTAL DISPLAY DEVICE AND METHOD FOR FABRICATING THE SAME

(71) Applicant: Samsung Display Co., Ltd., Yongin-si, Gyeonggi-do (KR)

(72) Inventors: Swaehyun Kim, Asan-si (KR); Jehyeong Park, Hwaseong-si (KR); Kyungbae Kim, Seoul (KR); Changil Tae, Seoul (KR); Kipyo Hong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/943,276

(22) Filed: Nov. 17, 2015

(65) Prior Publication Data

US 2016/0139468 A1    May 19, 2016

(30) Foreign Application Priority Data

Nov. 18, 2014   (KR) ..................... 10-2014-0161079

(51) Int. Cl.
| | | |
|---|---|---|
| *G02F 1/1343* | (2006.01) | |
| *G02F 1/1333* | (2006.01) | |
| *G02F 1/1337* | (2006.01) | |
| G02F 1/1362 | (2006.01) | |

(52) U.S. Cl.
CPC .. *G02F 1/134309* (2013.01); *G02F 1/133345* (2013.01); *G02F 1/133707* (2013.01); *G02F 1/136209* (2013.01); *G02F 2001/134345* (2013.01); *G02F 2001/136222* (2013.01)

(58) Field of Classification Search
CPC ................................................ G02F 1/134309
See application file for complete search history.

(56) References Cited

U.S. PATENT DOCUMENTS

| | | | |
|---|---|---|---|
| 2011/0260957 A1* | 10/2011 | Jeong | G02F 1/133707 345/98 |
| 2011/0317104 A1 | 12/2011 | Nakamura et al. | |
| 2012/0162559 A1* | 6/2012 | Kim | G02F 1/134363 349/42 |
| 2012/0236245 A1 | 9/2012 | Jung et al. | |
| 2014/0098317 A1 | 4/2014 | Jung et al. | |
| 2014/0104532 A1 | 4/2014 | Cho et al. | |

FOREIGN PATENT DOCUMENTS

| | | |
|---|---|---|
| KR | 1020110112219 A | 10/2011 |
| KR | 1020120074967 A | 7/2012 |
| KR | 1020120104720 A | 9/2012 |
| KR | 1020140046259 A | 4/2014 |
| KR | 1020140048731 A | 4/2014 |

* cited by examiner

*Primary Examiner* — Richard Kim
*Assistant Examiner* — Edmond Lau
(74) *Attorney, Agent, or Firm* — H.C. Park & Associates, PLC

(57) ABSTRACT

A liquid crystal display device includes: a first substrate; a second substrate positioned parallel to the first substrate; a liquid crystal layer between the first substrate and the second substrate. A black matrix disposed on one of the first substrate and the second substrate and configured to define a pixel region. A lower pixel electrode on the first substrate corresponding to the pixel region. An upper insulating layer disposed on the lower pixel electrode and having at least one groove. An upper pixel electrode disposed on the upper insulating layer and receiving a data signal from a thin film transistor, the data signal applied from a data line.

19 Claims, 22 Drawing Sheets

LIQUID CRYSTAL DISPLAY DEVICE AND METHOD FOR FABRICATING THE SAME

CLAIM OF PRIORITY

This application claims priority to and the benefit of Korean Patent Application No. 10-2014-0161079, filed on Nov. 18, 2014, with the Korean Intellectual Property Office, the disclosure of which is incorporated herein in its entirety by reference.

BACKGROUND OF THE INVENTION

1. Field of the Invention

Embodiments of the present invention relate to a liquid crystal display device capable of properly controlling movement of liquid crystal molecules disposed adjacent to a border area between domains and to a method of manufacturing the liquid crystal display device.

2. Description of the Related Art

Liquid crystal display devices (LCD Device) are a type of flat panel display (FPD) that are most widely used these days. An LCD device includes two substrates that have electric field generating electrodes formed thereon and a liquid crystal layer interposed therebetween. Upon applying voltage to the two electrodes, liquid crystal molecules of the liquid crystal layer are rearranged, thereby adjusting an amount of transmitted light, to display an image.

It is to be understood that this Related Art section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a liquid crystal display device capable of properly controlling movement of liquid crystal molecules disposed adjacent to a border area between domains and to a method of manufacturing the liquid crystal display device.

According to an embodiment of the present invention, a liquid crystal display device includes: a first substrate; a second substrate positioned opposed to the first substrate; a liquid crystal layer between the first substrate and the second substrate; a black matrix disposed on one of the first substrate and the second substrate and configured to define a pixel region; a lower pixel electrode on the first substrate corresponding to the pixel region; an upper insulating layer disposed on the lower pixel electrode and having at least one groove; and an upper pixel electrode disposed on the upper insulating layer and receiving a data signal from a thin film transistor, the data signal applied from a data line.

The liquid crystal display device may further include: a color filter on the first substrate; and a lower insulating layer between the color filter and the lower pixel electrode, the lower insulating layer having at least one hole.

The groove of the upper insulating layer may be formed corresponding to the hole of the lower insulating layer.

The hole of the lower insulating layer may not overlap the lower pixel electrode.

The color filter may have at least one groove.

The groove of the color filter may be disposed corresponding to the hole of the lower insulating layer.

The upper insulating layer may have a groove having a depth in a range of about 500 Å to about 1000 Å.

The upper insulating layer may include a side surface and as bottom surface forming a degree in a range of about 90 to about 130 degrees in the groove.

The groove of the upper insulating layer may not overlap the lower pixel electrode.

A part of the upper pixel electrode may overlap the hole of the lower insulating layer.

The lower pixel electrode may include: a first lower sub-pixel electrode in a first sub-pixel region of the pixel region; and a second lower sub-pixel electrode in a second sub-pixel region of the pixel region, the second lower sub-pixel electrode separated from the first lower sub-pixel electrode.

The upper pixel electrode may include a first upper sub-pixel electrode on the first lower sub-pixel electrode; and a second upper sub-pixel electrode disposed on the second lower sub-pixel electrode and connected to the first upper sub-pixel electrode.

The first lower sub-pixel electrode may include: a stem electrode dividing the first sub-pixel region into a plurality of domains; and a branch electrode extending from the stem electrode to the domains.

The first upper sub-pixel electrode may overlap the stem electrode of the first lower sub-pixel electrode and not overlapping the branch electrode of the first lower sub-pixel electrode.

The second upper sub-pixel electrode may include: a stem electrode dividing the second sub-pixel region into a plurality of domains; and a branch electrode extending from the stem electrode to the domains.

The second lower sub-pixel electrode ma include a plurality of surface electrodes occupying only a part of each domain in the second sub-pixel region.

A method of manufacturing a liquid crystal display device includes: forming a lower insulating layer on a first substrate; forming a lower pixel electrode layer on the lower insulating layer; forming a photoresist pattern on the lower pixel electrode layer; forming a lower pixel electrode pattern on a pixel region using the photoresist pattern as a mask; forming at least one hole on the lower insulating layer using the photoresist pattern and the lower pixel electrode pattern as a mask; removing the photoresist pattern; forming an upper insulating layer on the lower insulating layer including the lower pixel electrode, the upper insulating layer having a groove on an area corresponding to the hole; and forming an upper pixel electrode on the upper insulating layer.

The method may further include: forming a color filter between the first substrate and the lower insulating layer; and forming a hole on the lower insulating layer and simultaneously forming a groove on the color filter using the photoresist pattern and the lower pixel electrode pattern as a mask.

The hole of the upper insulating layer and the groove of the color filter partially may overlap the upper pixel electrode.

According to embodiments of the present invention, a liquid crystal display device has the following effects.

An upper insulating layer has at least one groove, and liquid crystal molecules may have a pre-tilt angle owing to the groove. Therefore, liquid crystal molecules disposed adjacent to a border area between domains may not be substantially influenced by an electric field generated by electrodes forming the border area.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
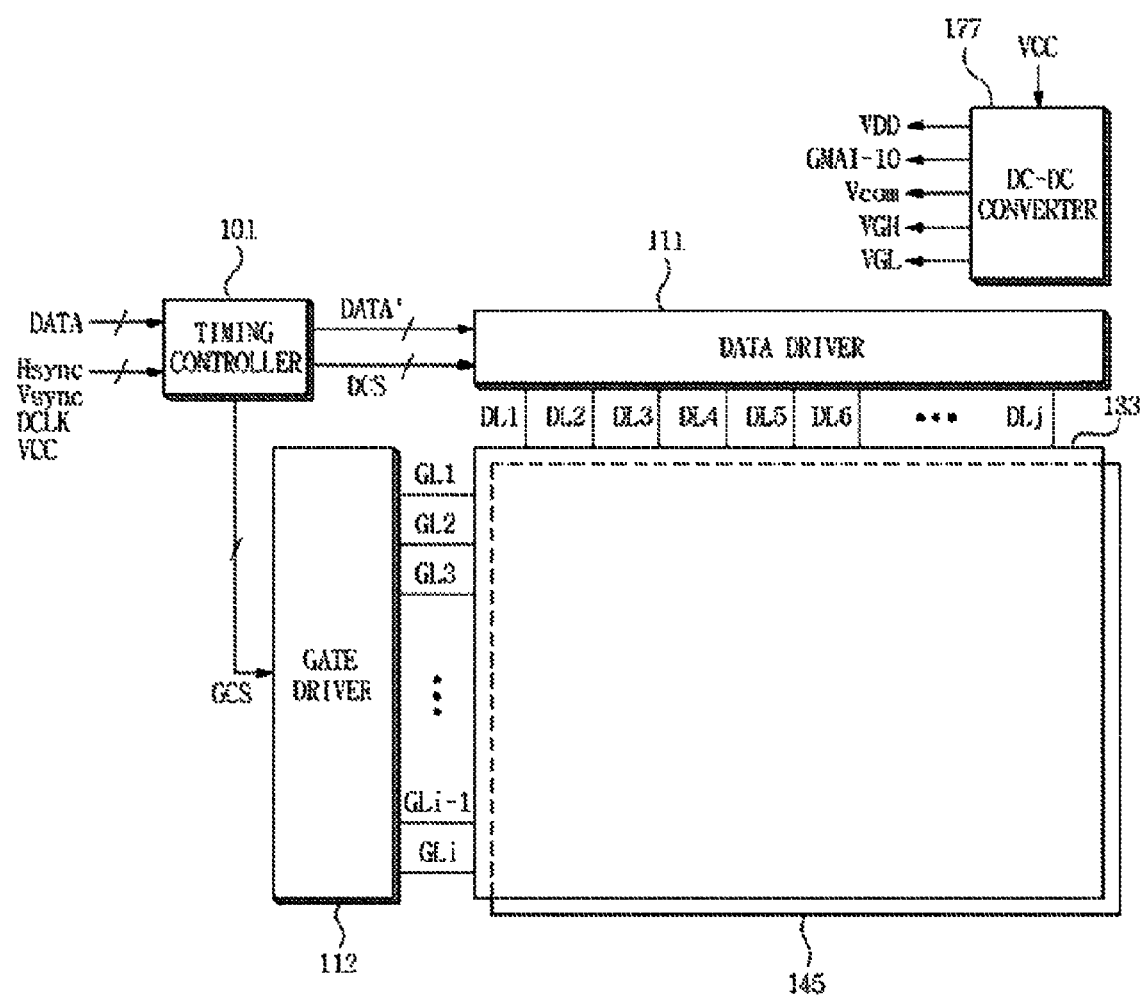
FIG. 1 is a block diagram illustrating a liquid crystal display device according to an embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and for "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

A LCD device may generally be categorized into a twisted nematic mode, a vertically aligned mode, a fringe field switch mode and an in-plane switching mode according to an alignment of liquid crystal molecules or an arrangement of electrodes when an electric field is not formed.

In the case of the vertically aligned mode of the LCD device, a method has been studied where one pixel is divided into a plurality of domains and voltages of different levels are respectively applied to the domains to impart different transmittances thereto, so as to achieve side visibility similar to front visibility.

Meanwhile, liquid crystal molecules disposed adjacent to a border area between domains are influenced by an electric field generated by electrodes forming the border area and may rotate in a wrong direction, thereby producing a dark portion in the border area.

Figure 2:
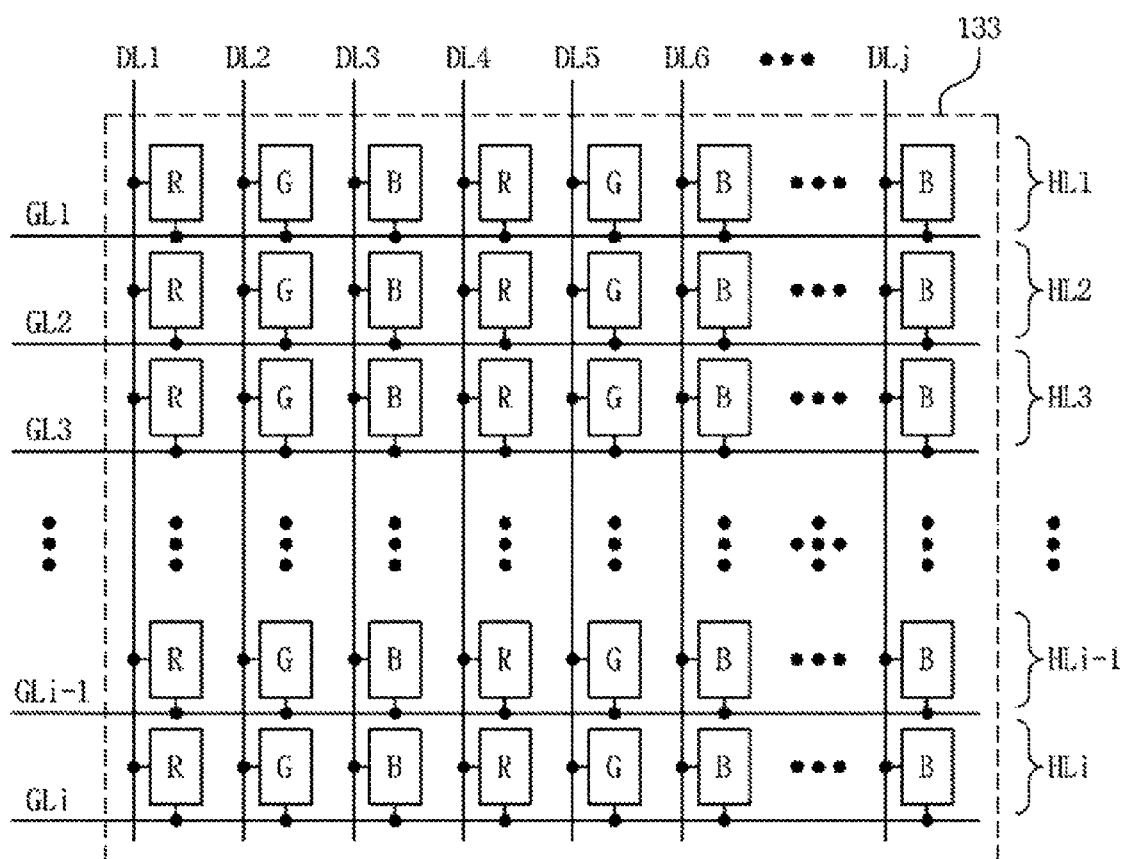
FIG. 2 is a detailed configuration view illustrating a display panel illustrated in FIG. 1.

FIG. 1 is a block diagram illustrating a liquid crystal display device according to an embodiment of the present invention, and FIG. 2 is a detailed configuration view illustrating a display panel illustrated in FIG. 1.

A liquid crystal display device (hereinafter LCD device) according to an embodiment of the present invention includes, as illustrated in FIG. 1, a display panel 133, a timing controller 101, a gate driver 112, a data driver 111, a backlight unit 145, and a DC-DC converter 177.

The display panel 133 is configured to display an image. The display panel 133 includes a liquid crystal layer (reference numeral 333 of FIG. 6), a first substrate (reference numeral 301 of FIG. 6) and a second substrate (reference numeral 302 of FIG. 6) facing each other with the liquid crystal layer 333 interposed therebetween.

Elements described below may be provided on each facing surface of the first and second substrates 301 and 302. The elements are as follows.

On the first substrate 301, as illustrated in FIG. 2, a plurality of gate lines GL1 to GLi, a plurality of data lines DL1 to DLj intersecting the gate lines GL1 to GLi, and thin film transistors (reference mark TFT of FIG. 3) connected to the gate lines GL1 to GLi and the data lines DL1 to DLj are disposed.

Meanwhile, a black matrix (reference numeral 376 of FIG. 6) and a plurality of color filters (reference numeral 354 of FIG. 6) may be further disposed on the first substrate 301. The black matrix 376 may be disposed on an area, except for an area corresponding to a pixel region (reference letter P of FIG. 3) of the display panel 133, of the first substrate 301. The color filters 354 are disposed on the pixel region P. The color filters 354 are categorized into red, green, and blue color filters.

Pixels R, G, and B are arranged in a matrix form. The pixels R, G, and B are categorized into red pixels R displaying a red image, green pixels G displaying a green image, and blue pixels B displaying a blue image. The red pixel R includes a red color filter, the green pixel G includes a green color filter, and a blue pixel B includes a blue color filter. In this case, the red, green, and blue pixels R, G, and B adjacently disposed in a horizontal direction form a unit pixel for displaying a unit image.

A common electrode (reference numeral 330 of FIG. 6) may be provided on the second substrate 302. The common electrode 330 may be formed on a front surface of the second substrate 302. Meanwhile, the above-described black matrix 376 and the plurality of color filters 354 may be disposed on the second substrate 302, instead of on the first substrate 301. For example, the black matrix 376 may be disposed on an area, except for an area corresponding to a pixel region P of the display panel 133, of the second substrate 302. Further, the plurality of color filters 354 are disposed on the second substrate 302, corresponding to the pixel region P. Meanwhile, although not illustrated, an overcoat layer may be further disposed on the color filter 354.

J pixels arranged along an nth (n is a number selected from 1 to i) horizontal line (hereinafter, nth horizontal line pixels) are respectively connected to the first to the jth data lines (DL1 to DLj). Further, the nth horizontal line pixels are connected to the nth gate line together. Accordingly, the nth horizontal line pixels receive an nth gate signal together. That is, j pixels aligned in the same horizontal line receive the same gate signal, while pixels arranged in different horizontal lines receive different gate signals. For example, both red and green pixels R and G disposed on the first horizontal line HL1 receive a first gate signal, while red and green pixels R and G disposed on the second horizontal line HL2 receive a second gate signal that has a different timing compared to the first gate signal.

The timing controller 101, although not illustrated, receives a vertical synchronization signal Vsync, a horizontal synchronization signal Hsync, an image data signal DATA, and a clock signal DCLK outputted from a graphic controller provided in a system. An interface circuit (not illustrated) may be provided between the timing controller 101 and the system, and the signals outputted from the system are inputted to the timing controller 101 through the interface circuit. The interface circuit may be equipped in the timing controller 101.

Although not illustrated, the interface circuit includes an LVDS receiver. The interface circuit lowers voltage levels of the vertical synchronization signal Vsync, the horizontal synchronization signal Hsync, the image data signal DATA, and the clock signal DCLK outputted from the system and also increases frequencies of the signals.

Meanwhile, because of a high frequency component of the signal inputted from the interface circuit to the timing controller 101, electromagnetic interference may be caused between the signals. In order to prevent the interference, an EMI filter (not illustrated) may be further provided between the interface circuit and the timing controller 101.

The timing controller 101 generates a gate control signal to control the gate driver 112 and a data control signal to control the data driver 111, using the vertical synchronization signal Vsync, the horizontal synchronization signal Hsync, the image data signal DATA, and the clock signal DCLK. The gate control signal includes a gate start pulse, a gate shift clock, a gate output enable signal, and the like. The data control signal includes a source start pulse, a source shift clock, a source output enable signal, a polarity signal, and the like.

Further, the timing controller 101 rearranges the image data signals DATA inputted from the system and transmits the rearranged image data signals DATA' to the data driver 111.

Meanwhile, the timing controller 101 is operated by a driving power VCC outputted from a power unit provided in the system, and the driving power VCC may be used as the power voltage of a phase lock loop PLL installed in the timing controller 101. The phase lock loop PLL compares the clock signal DCLK inputted to the timing controller 101 with a reference frequency generated from an oscillator. In a case where there is a difference between the compared values, the phase lock loop PPL adjusts the frequency of the clock signal by the difference to produce a sampling clock signal. The sampling clock signal is a signal to perform sampling of the image data signals DATA'.

The DC-DC converter 177 increases or decreases the driving power VCC inputted from the system to generate voltage required for the display panel 133. For this purpose, the DC-DC converter 177 may include, for example, an output switching element for switching an output voltage of an output terminal; and a pulse width modulator PWM for controlling a duty ratio or a frequency of a control signal applied to a control terminal of the output switching element so as to increase or decrease the output voltage. Herein, the DC-DC converter 177 may include a pulse frequency modulator PFM, instead of the pulse width modulator PWM.

The pulse width modulator PWM increases the duty ratio of the above-described control signal to increase the output voltage of the DC-DC converter 177 or decreases the duty ratio of the control signal to lower the output voltage of the DC-DC converter 177. The pulse frequency modulator PFM increases the frequency of the above-described control signal to increase the output voltage of the DC-DC converter 177 or decreases the frequency of the control signal to lower the output voltage of the DC-DC converter 177. The output voltage of the DC-DC converter 177 includes a reference voltage VDD of about 6[V] or more, a gamma reference voltage GMA1-10 of less than 10 level, a common voltage in a range from about 2.5 to 3.3[V], a gate high voltage of about 15[V] or more, and a gate low voltage of −4[V] or less.

The gamma reference voltage GMA1-10 is voltage generated by voltage division of the reference voltage. The reference voltage and the gamma reference voltage are analog gamma voltages, and provided to a data driving integrated circuit D-IC. The common voltage is applied to the common electrode 330 of the display panel 133 via the data driving integrated circuit D-IC. The gate high voltage is a high logic voltage of the gate signal, which is set to be a threshold voltage or higher of the thin film transistor (hereinafter TFT). The gate low voltage is a low logic voltage of the gate signal, which is set to be an off voltage of the TFT. The gate high voltage and the gate low voltage are applied to the gate driver 112.

The gate driver 112 may be configured to produce the gate signals according to the gate control signals GCS applied from the timing controller 101 and sequentially apply the gate signals to the plurality of gate lines GL1 to GLi. The gate driver 112 may include, for example, a shift register that shifts the gate start pulse to thereby produce the gate signals according to the gate shift clock. The shift register may include a plurality of switching elements. The switching elements may be formed on the first substrate 301 in the same process as in the TFT of the display area.

The data driver 111 may be configured to receive the image data signals DATA' and the data control signal DCS from the timing controller 101. The data driver 111 performs sampling of the image data signals DATA' according to the data control signal DCS, performs latching of the sampled image data signals corresponding to one horizontal line each horizontal period, and applies the latched image data signals to the data lines DL1 to DLj. That is, the data driver 111 converts the image data signals DATA' applied from the timing controller 101 into analog image data signals using the gamma reference voltages GMA1-10 inputted from the DC-DC converter 177 and provides them to the data lines DL1 to DLj.

The backlight unit 145 may be configured to provide light to the display panel 133. For this purpose, the backlight unit 145 may include a plurality of light source arrays. Herein, the light source arrays may include at least one light source. The light source may be a light emission package including at least one light emitting diode (LED).

Figure 3:
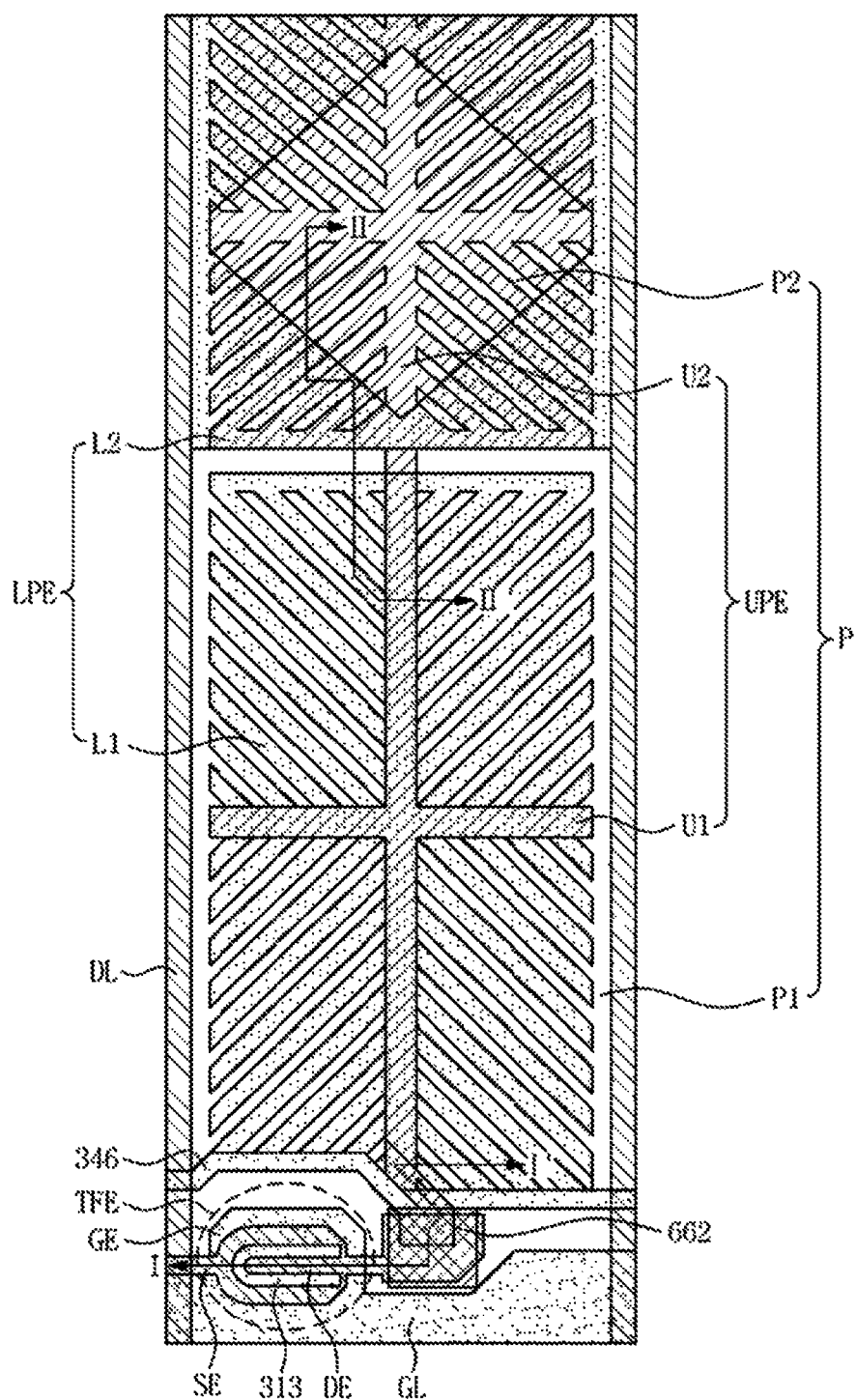
FIG. 3 is a detailed configuration view illustrating one pixel illustrated in FIG. 2.
Figure 4:
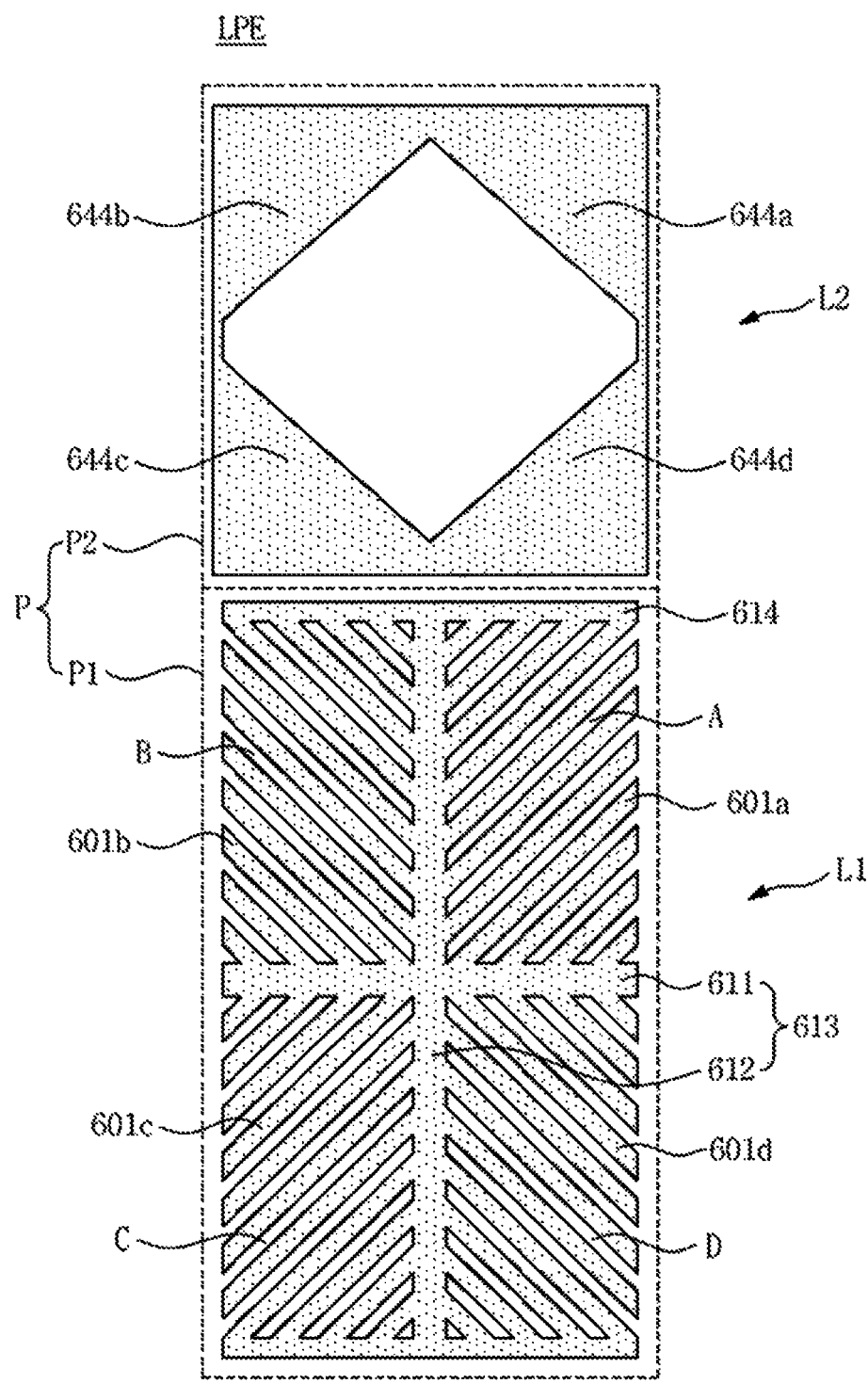
FIG. 4 is a view illustrating a lower pixel electrode illustrated in FIG. 3.
Figure 5:
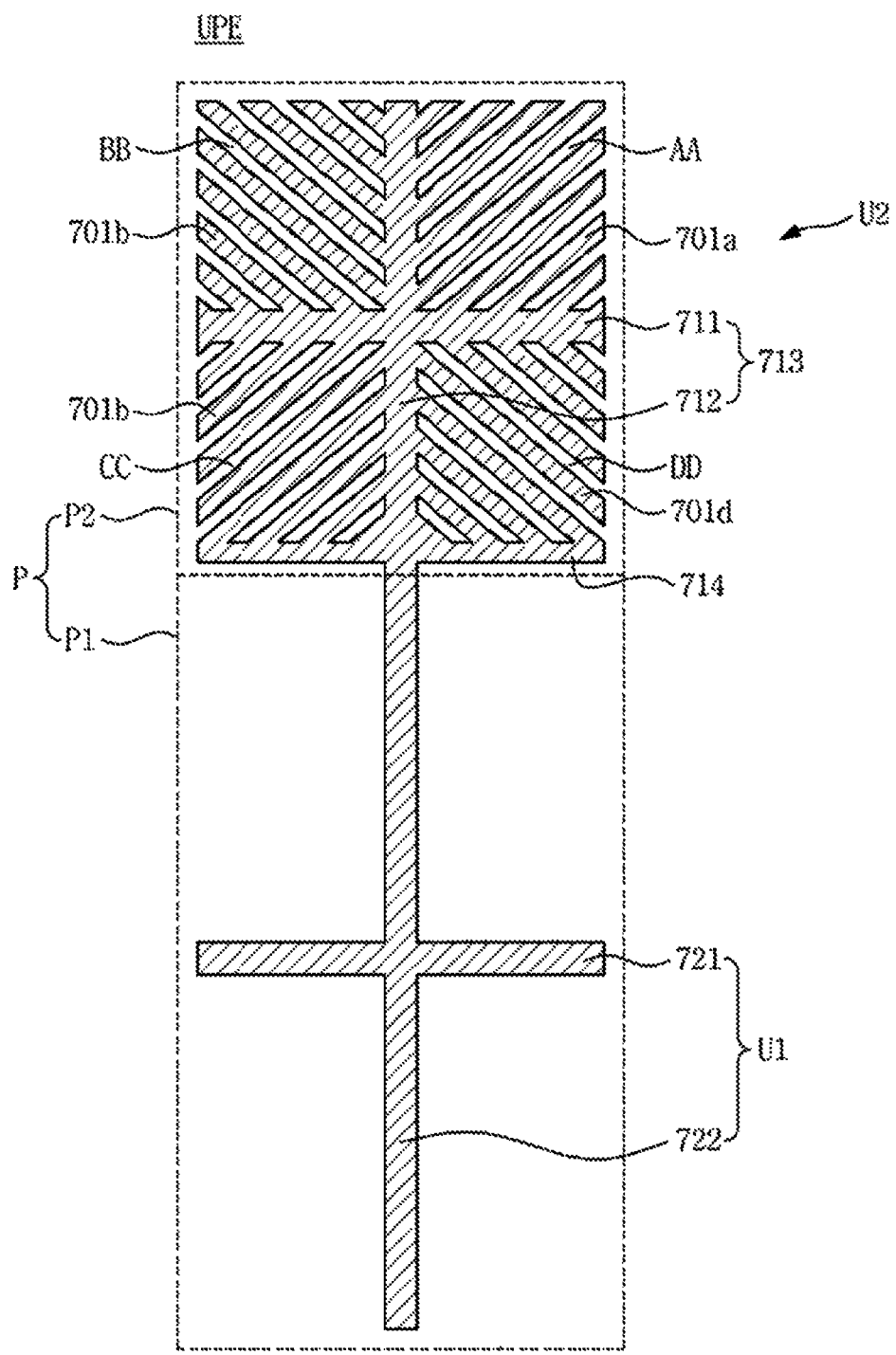
FIG. 5 is a view illustrating an upper pixel electrode illustrated in FIG. 3.
Figure 6:
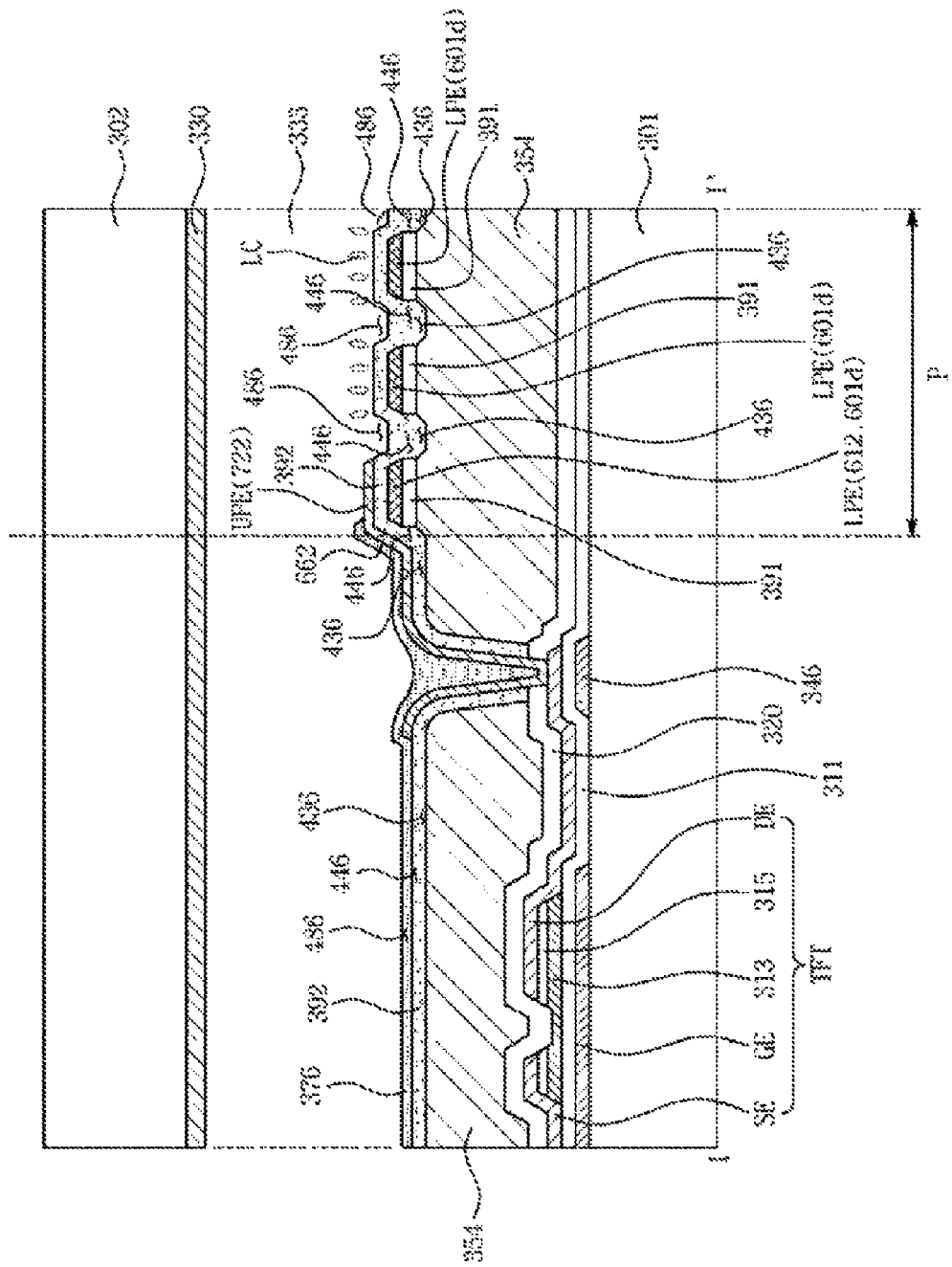
FIG. 6 is a cross-sectional view taken along line I-I' illustrated in FIG. 3.
Figure 7:
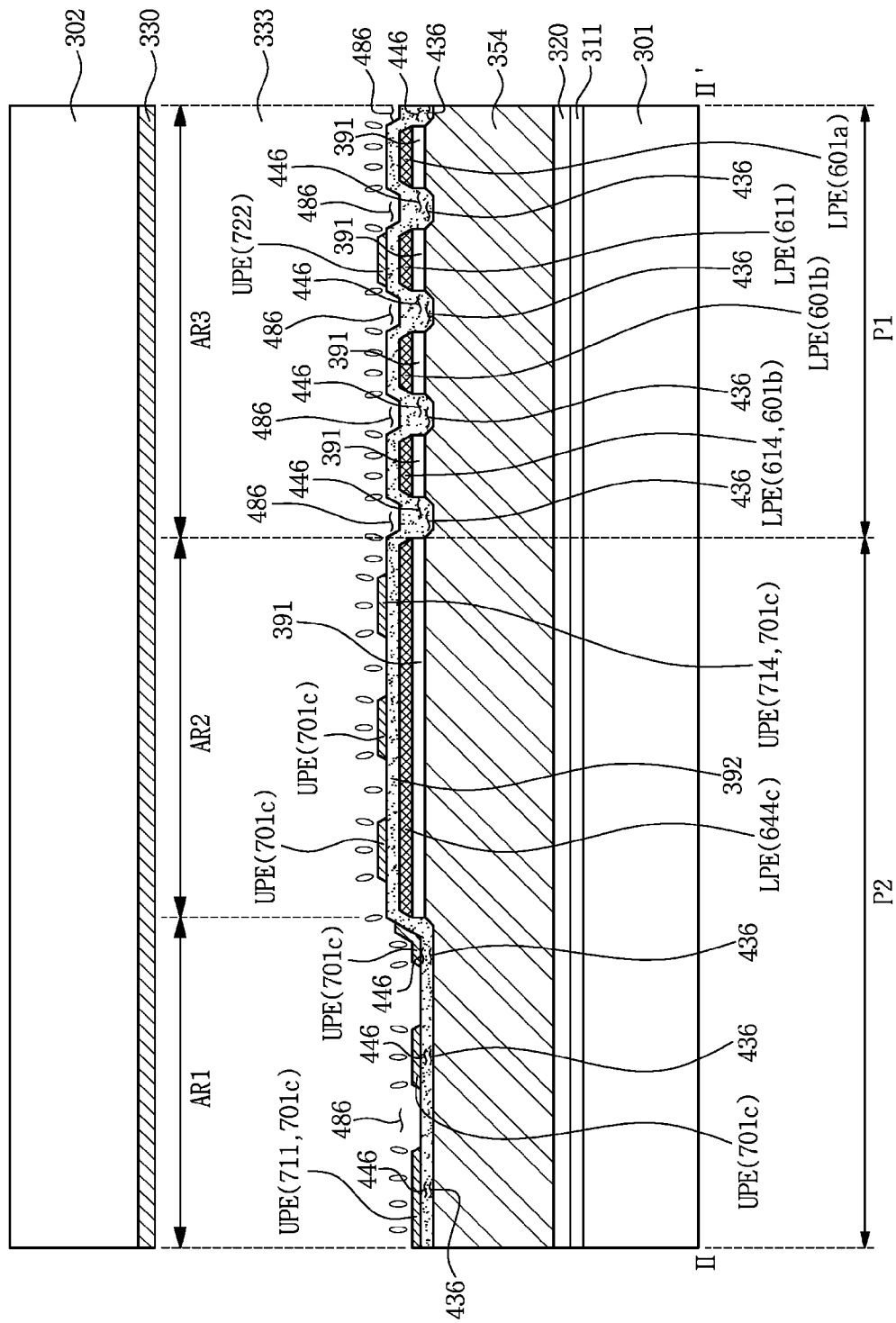
FIG. 7 is a cross-sectional view taken along line II-II' illustrated in FIG. 3.

FIG. 3 is a detailed configuration view illustrating one pixel illustrated in FIG. 2, FIG. 4 is a view illustrating a lower pixel electrode illustrated in FIG. 3, FIG. 5 is a view illustrating an upper pixel electrode illustrated in FIG. 3, FIG. 6 is a cross-sectional view taken along line I-I' illustrated, in FIG. 3, and FIG. 7 is a cross-sectional view taken along line illustrated in FIG. 4.

One pixel includes, as illustrated in FIGS. 3 to 7, the TFT, the color filter 354, the lower pixel electrode LPE, the upper pixel electrode UPE, the common electrode 330, and the liquid crystal layer 333. Herein, the TFT includes, as illustrated in FIGS. 3 and 6, a gate electrode GE, a semiconductor layer 313, a source electrode SE, and a drain electrode DE. Meanwhile, the common electrode of each pixel is integrally formed and the liquid crystal layer 333 of each pixel is integrally formed.

Meanwhile, as illustrated in FIGS. 3 and 6, one pixel may further include at least one dummy line 346. When the data line is cut, the dummy line 346 may be electrically connected to at least one of the upper pixel electrode UPE and the drain electrode. That is, when a laser beam is irradiated to an overlapping area of the dummy line 346 and the drain electrode DE, an overlapping area of the dummy line 346 and the upper pixel electrode UPE, or an overlapping area of all of the dummy line 346, the drain electrode DE, and the upper pixel electrode UPE, the gate insulating layer 311 of the corresponding area may be removed, such that the dummy line 346 and the upper pixel electrode UPE may be electrically connected. A common voltage or a dummy voltage may be applied to the dummy line 346. A pixel applied with the common voltage or the dummy voltage through the dummy line 346 may display a black image.

As illustrated in FIGS. 3 and 6, the gate line GL, the gate electrode GE, and the dummy line 346 are disposed on the first substrate 301. Although not illustrated, a connecting portion (e.g., an end portion) of the gate line GL may be larger than other portions thereof in size, so as to be properly connected to another layer or external driving circuits. The gate line GL may include, for example, aluminum (AL)-based metal such as aluminum or an aluminum alloy, silver (Ag)-based metal such as silver or a silver alloy, copper (Cu)-based metal such as copper (Cu) or a copper alloy, molybdenum (Mo)-based metal such as molybdenum or a molybdenum alloy. Further, the gate line GL may be made of, for example, one of chromium (Cr), tantalum (Ta) and titanium (Ti). Meanwhile, the gate line GL may have a multi-layer structure including at least two conductive layers that have physical properties different from each other.

The gate electrode GE branches out or extends from the gate line GL. As illustrated in FIG. 3, the gate electrode GE protrudes toward the pixel region P. The gate electrode GE may be made of the same material and have the same structure (a multi-layer structure) as the gate line GL. That is, the gate electrode GE and the gate line GL may be simultaneously formed in the same process.

The dummy line 346 may be made of the same material and have the same structure (a multi-layer structure) as the gate line GL. That is, the dummy line 346, the gate line GL, and the gate electrode GE may be simultaneously formed in the same process.

The gate insulating layer 311 may be disposed on the gate line GL, the gate electrode GE, and the dummy line 346. In this case, the gate insulating layer 311 may be formed over the entire surface of the first substrate 301 including the gate line GL, the gate electrode GE, and the dummy the 346. The gate insulating layer 311 may be made of, for example, silicon nitrides (SiNx), silicon oxides (SiOx), and the like. The gate insulating layer 311 may have a multi-layer structure including at least two insulating layers that have physical properties different from each other.

The semiconductor layer 313 may be disposed on the gate insulating layer 311. In this case, the semiconductor layer 313 may at least partially overlap the gate electrode GE. The semiconductor layer 313 may be made of amorphous silicon, polycrystalline silicon, and the like.

An ohmic contact layer 315 may be disposed on the semiconductor layer 313. The ohmic contact layer 315 may include n+ hydrogenated amorphous silicon highly doped with n-type impurities, such as phosphorus, or silicide. The ohmic contact layer 315 may be disposed on the semiconductor layer 313 in pairs.

The source and drain electrodes SE and DE may be disposed on the ohmic contact layer 315.

The source electrode SE branches out or extends from the data line DL and protrudes toward the gate electrode GE, as illustrated in FIG. 3. In this case, the source electrode SE may have a form partially surrounding the drain electrode DE. At least a part of the source electrode SE overlaps the semiconductor layer 313 and the gate electrode GE. The source electrode SE may have one of a C-form, an inverted C-form, a U-form, and an inverted U-form.

In some applications, it is desirable that the source electrode is made of refractory metal, such as molybdenum, chromium, tantalum and titanium, or a metal alloy thereof, and may have a multi-layer structure including a refractory metal layer and a low-resistance conductive layer. Examples of the multi-layer structure include: a double-layer structure including a chromium or molybdenum (alloy) lower film and an aluminum (alloy) upper film; and a triple-layer structure including a molybdenum (alloy) lower film, an aluminum (alloy) intermediate film, and a molybdenum (alloy) upper film. Further, the source electrode SE may be formed of various metals or conductive materials rather than the above-described materials.

One side of the drain electrode DE may be connected to the upper pixel electrode UPE. At least a part of the other side of the drain electrode DE overlaps the semiconductor layer 113, the gate electrode GE, and the dummy line 346. The drain electrode DE may include the same material and have the same structure (a multi-layer structure) as the source electrode SE. That is, the drain electrode DE and the source electrode SE may be simultaneously formed in the same process.

The gate, source, and drain electrodes GE, SE, and DE together form the TFT along with the semiconductor layer 113. In this case, a channel of the TFT may be formed on the semiconductor layer 313 portion between the source and drain electrodes SE and DE.

The data line DL may be disposed on the gate insulating layer 311. Although not illustrated, the data line DL may have a connecting portion (e.g., an end portion) that may be larger than other portions thereof in size, so as to be properly connected to another layer or external driving circuits.

The data line DL may be configured to transmit a data signal and extends in its length direction to intersect the gate line GL. In this case, a center portion of the data line DL may be bent into a V-shape, so that the LCD device can have a greater transmittance. The data line DL may include the same material and have the same structure (a multi-layer structure) as the source electrode SE. That is, the data line DL and the source electrode SE may be simultaneously formed in the same process.

The protective layer 320 may be disposed on the data line DL, the source electrode SE, and the drain electrode DE. In this case, the protective layer 320 may be formed over the entire surface of the first substrate 301 including the data line DL, the source electrode SE, and the drain electrode DE. The protective layer 320 may be formed of, for example, inorganic insulating materials such as silicon nitrides (SiNx) and silicon oxides (SiOx). When the protective layer 320 is made of an inorganic insulating material, an inorganic material having photosensitivity and a dielectric constant of about 4.0 may be used. The protective layer 320 may also have a double layer structure including a lower inorganic layer and an upper organic layer, which has been found to impart desirable insulating properties and also to prevent damage to exposed portions of the semiconductor layer 313. As examples, the protective layer 320 may have a thickness of about 5000 Å or more and may be about 6000 Å to about 8000 Å.

A lower contact hole (reference numeral 360a of FIG. 9I) may be formed to extend partially through the protective layer 320. A part of the drain electrode DE may be exposed through the lower contact hole 360a.

As illustrated in FIG. 6, the color filter 354 may be disposed on the protective layer 320. The color filter 354 may be disposed on the pixel region P. In this case, an edge portion of the color filter 354 may be disposed on the gate line GL including the gate electrode GE, the TFT, and the data line DL. However, the color filter 354 does not overlap a connecting portion of the drain electrode DE and the upper pixel electrode UPE. That is, the color filter 354 is not formed on the protective layer 350 corresponding to the connecting portion. Meanwhile, the edge portion of the color filter 354 may overlap an edge portion of another adjacent color filter 354.

The color filter 354 may include a photosensitive organic material.

Meanwhile, the color filter 354 may have at least one groove 436. The groove 436 is defined on a portion of the color filter 354 that does not overlap the lower pixel electrode LPE. Meanwhile, the groove 436 partially overlaps the upper pixel electrode UPE.

The lower insulating layer 391 may be disposed on the color filter 354. The lower insulating layer 391 functions as a capping layer. That is, the lower insulating layer 391 blocks diffusion of undesirable materials produced by the color filter 354. The lower insulating layer 391 may be formed of silicon nitrides (SiNx) or silicon oxides (SiOx). Meanwhile, the lower insulating layer 391 may have at least one hole 446. The hole 446 may correspond to a portion of the color filter 354 that does not overlap the lower pixel electrode LPE. Meanwhile, the hole 446 partially overlaps the upper pixel electrode UPE.

As illustrated in FIG. 3, the lower pixel electrode LPE may be disposed in the pixel region P. In this case, as illustrated in FIGS. 6 and 7, the lower pixel electrode LPE may be disposed on the lower insulating layer 391. Hereinafter, the lower pixel electrode LPE is described in detail with reference to FIG. 4.

The lower pixel electrode LPE includes, as illustrated in FIG. 4, a first lower sub-pixel electrode L1 and a second lower sub-pixel electrode L2 separated from each other.

The pixel region P may be partitioned into a first sub-pixel electrode P1 and a second sub-pixel electrode P2. The first lower sub-pixel electrode L1 may be disposed on the first sub-pixel region P1.

The first lower sub-pixel electrode L1 is not connected to anything, and thus maintains a floating state.

The first lower sub-pixel electrode L1 includes a stem electrode 613 and a plurality of branch electrodes 601a, 601b, 601c, and 601d that are integrally formed along with the stem electrode 613.

The stem electrode 613 divides the first sub-pixel region P1 into a plurality of domains. For example, the stem electrode 613 includes a horizontal portion 611 and a vertical portion 612 intersecting each other. The horizontal portion 611 divides the first sub-pixel region P1 into two domains and the vertical portion 612 divides each of the divided two domains into another two smaller domains. The first sub-pixel region P1 is divided into four domains A, B, C, and D by the stem electrode 613 including the horizontal portion 611 and the vertical portion 612.

The branch electrodes 601*a*, 601*b*, 601*c*, and 601*d* include first to fourth branch electrodes 601*a*, 601*b*, 601*c*, and 601*d* respectively extending toward different directions from the stem electrode 613. That is, the first to fourth branch electrodes 601*a*, 601*b*, 601*c*, and 601*d* extend from the stem electrode 613 into each of the domains A, B, C, and D. For example, the first branch electrode 601*a* may be disposed in the first domain A, the second branch electrode 601*b* may be disposed in the second domain B, the third branch electrode 601*c* may be disposed in the third domain C, and the fourth branch electrode 601*d* may be disposed in the fourth domain D.

The first branch electrode 601*a* and the second branch electrode 601*b* are symmetric to each other with respect to the vertical portion 612 and the third branch electrode 601*c* and the fourth branch electrode 601*d* are symmetric to each other with respect to the vertical portion 612. Further, the first branch electrode 601*a* and the fourth branch electrode 601*d* are symmetric to each other with respect to the horizontal portion 611 and the second branch electrode 601*b* and the third branch electrode 601*c* are symmetric, to each other with respect to the horizontal portion 611.

The first branch electrodes 601*a* may be provided in plural in the first domain A. In this case, the plurality of first branch electrodes 601*a* may be arranged in parallel with each other. Herein, a part of the branch electrodes of the first branch electrodes 601*a* extend from one side of the horizontal portion 611, which is in contact with the first domain A, in a diagonal direction with respect to the one side thereof. Further, the other branch electrodes of the first branch electrodes 601*a* extend from one side of the vertical portion 612, which is in contact with the first domain A, in a diagonal direction with respect to the one side thereof.

The second branch electrodes 601*b* may be provided in plural in the second domain B. In this case, the plurality of second branch electrodes 601*b* may be arranged in parallel with each other. Herein, a part of the branch electrodes of the second branch electrodes 601*b* extend from one side of the horizontal portion 611, which is in contact with the second domain B, in a diagonal direction with respect to the one side thereof. Further, the other branch electrodes of the second branch electrodes 601*b* extend from one side of the vertical portion 612, which is in contact with the second domain B, in a diagonal direction with respect to the one side thereof.

The third branch electrodes 601*c* may be provided in plural in the third domain C. In this case, the plurality of third branch electrodes 601*c* may be arranged in parallel with each other. Herein, a part of the branch electrodes of the third branch electrodes 601*c* extend from one side of the horizontal portion 611, which is in contact with the third domain C, in a diagonal direction with respect to the one side thereof. Further, the other branch electrodes of the third branch electrodes 601*c* extend from one side of the vertical portion 612, which is in contact with the third domain C, in a diagonal direction with respect to the one side thereof.

The fourth branch electrodes 601*d* may be provided in plural in the fourth domain D. In this case, the plurality of fourth branch electrodes 601*d* is arranged in parallel with each other. Herein, a part of the branch electrodes of the fourth branch electrodes 601*d* extend from one side of the horizontal portion 611, which is in contact with the fourth domain D, in a diagonal direction with respect to the one side thereof. Further, the other branch electrodes of the fourth branch electrodes 601*d* extend from one side of the vertical portion 612, which is in contact with the fourth domain D, in a diagonal direction with respect to the one side thereof.

Meanwhile, end portions of a part of the first branch electrodes 601*a* disposed in the first domain A may be connected to end portions of a part of the second branch electrodes 601*b* disposed in the second domain B by a connecting portion 614.

The second lower sub-pixel electrode L2 may be disposed in the second sub-pixel region P2. The second lower sub-pixel electrode L2 has a closed-loop shape surrounding a center portion of the second sub-pixel region P2. For this purpose, the second lower sub-pixel electrode L2 may have an open center portion. As described below, the second sub-pixel region P2 may be divided into a plurality of domains by the upper pixel electrode UPE, and thus the second lower sub-pixel electrode L2 occupies a part of each domain. For example, the second lower sub-pixel electrode L2 may include, as illustrated in FIG. 4, first to fourth surface electrodes 644*a*, 644*b*, 641*c*, and 644*d*. In this case, the first surface electrode 644*a* occupies a part of the first domain A, the second surface electrode 644*b* occupies a part of the second domain B, the third surface electrode 644*c* occupies a part of the third domain C, and the fourth surface electrode 644*d* occupies a part of the fourth domain D. In this case, both end portions of each of the surface electrodes 644*a*, 644*b*, 644*c*, and 644*d* are connected to end portions of another adjacent surface electrodes.

The second lower sub-pixel electrode L2 externally receives a drop signal. The drop signal may be a common voltage or a voltage smaller than the common voltage. For example, the drop signal may be half the value of the common voltage.

The drop signal may be supplied from the gate driver 112.

Meanwhile, the second lower sub-pixel electrodes L2 provided in pixels of one horizontal line may be connected to each other. In this case, the drop signal may be applied to the second lower sub-pixel electrode L2 provided in an outermost pixel disposed most adjacent to the gate driver 112. Meanwhile, the connecting portion between the adjacently disposed second lower sub-pixel electrodes L2 intersects the data line disposed between the second lower sub-pixel electrodes L2.

The above-described groove 436 and hole 446 are defined, as illustrated in FIG. 4, on the color filter 354 and the lower insulating layer 391, except for an area covered by the lower pixel electrode LPE. For example, the groove 436 and the hole 446 are defined between the first branch electrodes 601*a*, between the second branch electrodes 601*b*, between the third branch electrodes 601*c*, between the fourth branch electrodes 601*d*, and in an aperture of the second lower sub-pixel electrode L2.

The lower pixel electrode LPE having the above-described structure may be formed of a transparent conductive material, such as indium tin oxide (ITO) and indium zinc oxide (IZO). In this case, the ITO may be polycrystalline or monocrystalline and the IZO may be polycrystalline or monocrystalline as well.

An upper insulating layer 392 may be disposed on the lower pixel electrode LPE and the color filter 354. In this case, the upper insulating layer 392 may be formed over the entire surface of the first substrate 301 including the lower pixel electrode LPE and the color filter 354. The upper insulating layer 392 may include the same material as one of the above-described protective layer 320, the gate insulating layer 311, and the lower insulating layer 391. Meanwhile, the upper insulating layer 392 may have at least one groove 486. The groove 486 may be defined in an area of the upper insulating layer 392 that does not overlap the lower pixel electrode LPE. Meanwhile, the groove 486 partially overlaps the upper pixel electrode UPE.

An upper contact hole (reference numeral 360b of FIG. 9I) may be formed to extend through the upper insulating layer 392. The upper contact hole 360b may be formed directly on the lower contact hole 360a. The upper contact hole 360b and the lower contact hole 360a are connected to each other to form a single drain contact hole (reference numeral 360 of FIG. 9I).

The black matrix 376 may be disposed on the upper insulating layer 392. The black matrix 376 blocks light leakage in an area except for the pixel region P.

As illustrated in FIG. 3, the upper pixel electrode UPE may be disposed on the pixel region P. In this case, as illustrated in FIGS. 6 and 7, the upper pixel electrode UPE may be disposed on the upper insulating layer 392.

The upper pixel electrode UPE forms an electric field along with the common electrode 330. The upper pixel electrode IPE may be electrically connected to the drain electrode DE using a connector 662. The connector 662 is integrally formed along with the upper pixel electrode UPE and disposed in the drain contact hole 360. The connector 662 may be connected to the drain electrode DE exposed through the drain contact hole 360.

Herein, the upper pixel electrode UPE is described below in more detail with reference to FIG. 5.

The upper pixel electrode UPE includes, as illustrated in FIG. 5, a first upper sub-pixel electrode U1 and a second upper sub-pixel electrode U2 connected to each other.

The first upper sub-pixel electrode U1 may be disposed on the first sub-pixel region P1. In this case, the first upper sub-pixel electrode U1 may be disposed on the first lower sub-pixel electrode L1.

The first upper sub-pixel electrode U1 divides the first sub-pixel region P1 into a plurality of domains. For example, the first upper sub-pixel electrode U1 includes a horizontal portion 721 and a vertical portion 722 intersecting each other. The horizontal portion 721 divides the first sub-pixel region P1 into two domains and the vertical portion 722 divides each of the divided two domains into another two smaller domains. The first sub-pixel region P1 may be divided into four domains A, B, C, and D by the first upper sub-pixel electrode U1 including the horizontal portion 721 and the vertical portion 722. The first upper sub-pixel electrode U1 has substantially the same shape as the stem electrode 613 of the above-described first lower sub-pixel electrode L1. At least a part of the first upper sub-pixel electrode U1 overlaps the stem electrode 613 provided in the first lower sub-pixel electrode L1. In this case, the stem electrode 613 may be entirely covered by the first upper sub-pixel electrode U1. Meanwhile, the first upper sub-pixel electrode U1 does not overlap the first to fourth branch electrodes 601a, 601b, 601c, and 601d disposed in the first lower sub-pixel electrode L1.

The second upper sub-pixel electrode U2 may be disposed on the second sub-pixel region P2. In this case, the second upper sub-pixel electrode U2 may be disposed on the second lower sub-pixel electrode L2.

The second upper sub-pixel electrode U2 includes a stem electrode 713 and a plurality of branch electrodes 701a, 701b, 701c, and 701d integrally formed along with the stem electrode 713.

The stem electrode 713 divides the second sub-pixel region P2 into a plurality of domains AA, BB, CC, and DD. For example, the stem electrode 713 includes a horizontal portion 711 and a vertical portion 712 intersecting each other. The horizontal portion 711 divides the second sub-pixel region P2 into two domains, and the vertical portion 712 divides each of the divided two domains into another two smaller domains. The second sub-pixel region P2 may be divided into the four domains AA, BB, CC, and DD by the stem electrode 713 including the horizontal portion 711 and the vertical portion 712.

The branch electrodes 701a, 701b, 701c, and 701d include first, second, third, and fourth branch electrodes 701a, 701b, 701c, and 701d respectively extending toward different directions from different points of the stem electrode 713. That is, the first, second, third, and fourth branch electrodes 701a, 701b, 701c, and 701d extend from the stem electrode 713 into each of the domains AA, BB, DC, and DD. For example, the first branch electrode 701a may be disposed in the first domain AA, the second branch electrode 701b may be disposed in the second domain BB, the third branch electrode 701c may be disposed in the third domain CC, and the fourth branch electrode 701d may be disposed in the fourth domain DD. The first branch electrode 701a and the second branch electrode 701b are symmetric to each other with respect to the vertical portion 712 and the third branch electrode 701c and the fourth branch electrode 701d are symmetric to each other with respect to the vertical portion 712. Further, the first branch electrode 701a and the fourth branch electrode 701d are symmetric to each other with respect to the horizontal portion 711 and the second branch electrode 701b and the third branch electrode 701c are symmetric to each other with respect to the horizontal portion 711.

The first branch electrode 701a may be provided in plural in the first domain AA. In this case, the plurality of first branch electrodes 701a may be arranged in parallel with each other. Herein, a part of the branch electrodes of the first branch electrodes 701a extend from one side of the horizontal portion 711, which is in contact with the first domain AA, in a diagonal direction with respect to the one side thereof. The other branch electrodes of the first branch electrodes 701a extend from one side of the vertical portion 712, which is in contact with the first domain AA, in a diagonal direction with respect to the one side thereof.

One side of each of the first branch electrodes 701a disposed in the first domain AA may be disposed in the aperture of the lower pixel electrode LPE. In this case, a groove 486 is defined on a portion of the upper insulating layer 392 that may be exposed by the aperture. The one side of each of the first branch electrodes 701a may be disposed in the groove 486. Meanwhile, another side of each of the first branch electrodes 701a disposed in the first domain AA may be disposed on the first surface electrode 644a.

As described above, a part of the first domain AA is occupied by the first surface electrode 644a but the other part thereof is not occupied. Accordingly, the another side of each of the first branch electrodes 701a disposed in the first domain AA overlaps the first surface electrode 644a, but the one side of each of the first branch electrodes 701a does not overlap the first surface electrode 644a. Accordingly, the first domain AA may be divided into a first area occupied only by the first branch electrodes 701a; and a second area occupied by the first branch electrodes 701a and the first surface electrode 644a overlapping each other. That is, the first domain AA may be further divided into two small domains by the first surface electrode 644a.

The second branch electrodes 701b may be provided in plural in the second domain BB. In this case, the plurality of second branch electrodes 701b may be arranged in parallel with each other. Herein, a part of the branch electrodes of the second branch electrodes 701*b* extend from one side of the horizontal portion 711, which is in contact with the second domain BB, in a diagonal direction with respect to the one side thereof. The other branch electrodes of the second branch electrodes 701*b* extend from one side of the vertical portion 712, which is in contact with the second domain BB, in a diagonal direction with respect to the one side thereof.

One side of each of the second branch electrodes 701*b* disposed in the second domain BB may be disposed in the aperture of the lower pixel electrode LPE. In this case, a groove 486 is defined on a portion of the upper insulating layer 392 that is exposed by the aperture. The one side of each of the second branch electrodes 701*b* may be disposed in the groove 486. Meanwhile, another side of each of the second branch electrodes 701*b* disposed in the second domain BB may be disposed on the second surface electrode 644*b*.

As described above, a part of the second domain BB is occupied by the second surface electrode 644*b* but the other part thereof is not occupied. Accordingly, the one side of each of the second branch electrodes 701*b* disposed in the second domain BB overlaps the second surface electrode 644*b*, but the another side of each of the second branch electrodes 701*b* does not overlap the second surface electrode 644*b*. Accordingly, the second domain BB may be divided into a first area occupied only by the second branch electrodes 701*b*; and a second area occupied by the second branch electrodes 701*b* and the second surface electrode 644*b* overlapping each other. That is the second domain BB may be further divided into two small domains by the second surface electrode 644*b*.

The third branch electrodes 701*c* may be provided in plural in the third domain CC. In this case, the plurality of third branch electrodes 701*c* may be arranged in parallel with each other. Herein, a part of the branch electrodes of the third branch electrodes 701*c* extend from one side of the horizontal portion 711, which is in contact with the third domain CC, in a diagonal direction with respect to the one side thereof. The other branch electrodes of the third branch electrodes 701*c* extend from one side of the vertical portion 712, which is in contact with the third domain CC in a diagonal direction with respect to the one side thereof.

One side of each of the third branch electrodes 701*c* disposed in the third domain CC may be disposed in the aperture of the lower pixel electrode LPE. In this case, a groove 486 is defined in an area of the upper insulating layer 392 that is exposed by the aperture. The one side of each of the third branch electrodes 701*c* may be disposed in the groove 486. Meanwhile, another side of each of the third branch electrodes 701*c* disposed in the third domain CC may be disposed on the third surface electrode 644*c*.

As described above, a part of the third domain CC is occupied by the third surface electrode 644*c* but the other part thereof is not occupied. Accordingly, the one side of each of the third branch electrodes 701*c* disposed in the third domain CC overlaps the third surface electrode 644*c*, but the another side of each of the third branch electrodes 701*c* does not overlap the third surface electrode 644*c*. Accordingly, the third domain CC may be divided into a first area occupied only by the third branch electrodes 701*c*; and a second area occupied by the third branch electrodes 701*c* and the third surface electrode 644*c* overlapping each other. That is, the third domain CC may be further divided into two small domains by the third surface electrode 644*c*.

The fourth branch electrodes 701*d* may be provided in plural in the fourth domain DD. In this case, the plurality of fourth branch electrodes 701*d* may be arranged in parallel with each other. Herein, a part of the branch electrodes of the fourth branch electrodes 701*d* extend from one side of the horizontal portion 711, which is in contact with the fourth domain DD, in a diagonal direction with respect to the one side thereof. The other branch electrodes of the fourth branch electrodes 701*d* extend from one side of the vertical portion 712, which is in contact with the fourth domain DD, in a diagonal direction with respect to the one side thereof.

One side of each of the fourth branch electrodes 701*d* disposed in the fourth domain DD may be disposed in the aperture of the lower pixel electrode LPE. In this case, a groove 486 is defined in an area of the upper insulating layer 392 that may be exposed by the aperture. The one side of each of the fourth branch electrodes 701*d* may be disposed in the groove 486. Meanwhile, another side of each of the fourth branch electrodes 701*d* disposed in the fourth domain DD may be disposed on the fourth surface electrode 644*d*.

As described above, a part of the fourth domain DD is occupied by the fourth surface electrode 644*d* but the other part thereof is not occupied. Accordingly, the one side of each of the fourth branch electrodes 701*d* disposed in the fourth domain DD overlaps the fourth surface electrode 644*d*, but the another side of each of the fourth branch electrodes 704*d* does not overlap the fourth surface electrode 644*d*. Accordingly, the fourth domain DD may be divided into a first area occupied only by the fourth branch electrodes 701*d*; and a second area occupied by the fourth branch electrodes 701*d* and the fourth surface electrode 644*d* overlapping each other. That is, the fourth domain DD may be further divided into two small domains by the fourth surface electrode 644*d*.

Accordingly, the second pixel region may be divided into 8 domains. Accordingly, one pixel region includes total 12(4+8) domains.

Meanwhile, end portions of a part of the third branch electrodes 701*c* disposed in the third domain CC and end portions of a part of the fourth branch electrodes 701*d* disposed in the fourth domain DD may be connected to each other by a connecting portion 714.

The upper pixel electrode UPE having the above-described structure may be formed of a transparent conductive material, such as ITO and IZO. In this case, the ITO may be polycrystalline or monocrystalline and the IZO may be polycrystalline or monocrystalline as well.

As illustrated in FIG. 7, liquid crystal molecules LC of a first area AR1 are controlled by a data signal applied to the second upper sub-pixel electrode U2. Liquid crystal molecules LC of a second area AR2 are controlled by the data signal applied to the second upper sub-pixel electrode U2 and the drop signal applied to the second lower sub-pixel electrode L2. Further, liquid crystal molecules LC of a third area AR3 are controlled by a data signal applied to the first upper sub-pixel electrode U1 and capacitance across the first upper sub-pixel electrode U1 and the first lower sub-pixel electrode L1. Accordingly, a pixel voltage corresponding to the data signal may be applied to the first area AR1, a pixel voltage that is attenuated by the drop signal may be applied to the second area AR2, and a pixel voltage that is more attenuated by the capacitance may be applied to the third area AR3. In other words, the pixel voltage applied to the first area AR1 is the largest and the pixel voltage applied to the third area AR3 is the smallest. Further, the pixel voltage applied to the second area AR2 is smaller than the pixel voltage applied to the first area AR1 and larger than the pixel voltage applied to the third area AR3.

Meanwhile, although not illustrated, a first alignment layer may be provided on the upper pixel electrode UPE and a second alignment layer may be provided on the common electrode 330.

The liquid crystal layer 333 may include nematic liquid crystal materials having a positive dielectric anisotropy. The liquid crystal molecules LC of the liquid crystal layer 333 have a major axis aligned in parallel with one of the first and second substrates 301 and 302. Further, the liquid crystal molecules may be spirally twisted 90 degrees from a rubbing direction of the first alignment layer to the second substrate 302.

In addition, the liquid crystal layer 333 may include vertically aligned liquid crystal materials, rather than the nematic liquid crystal material. In this case, the first alignment layer may be a vertical alignment layer or an alignment layer including a photo-reactive material. Further, the second alignment layer may be a vertical alignment layer or an alignment layer optically aligned using photo-polymerization materials.

Meanwhile, the liquid crystal layer 333 may include liquid crystal molecules having a negative dielectric anisotropy, rather than the nematic liquid crystal material.

Figure 8:
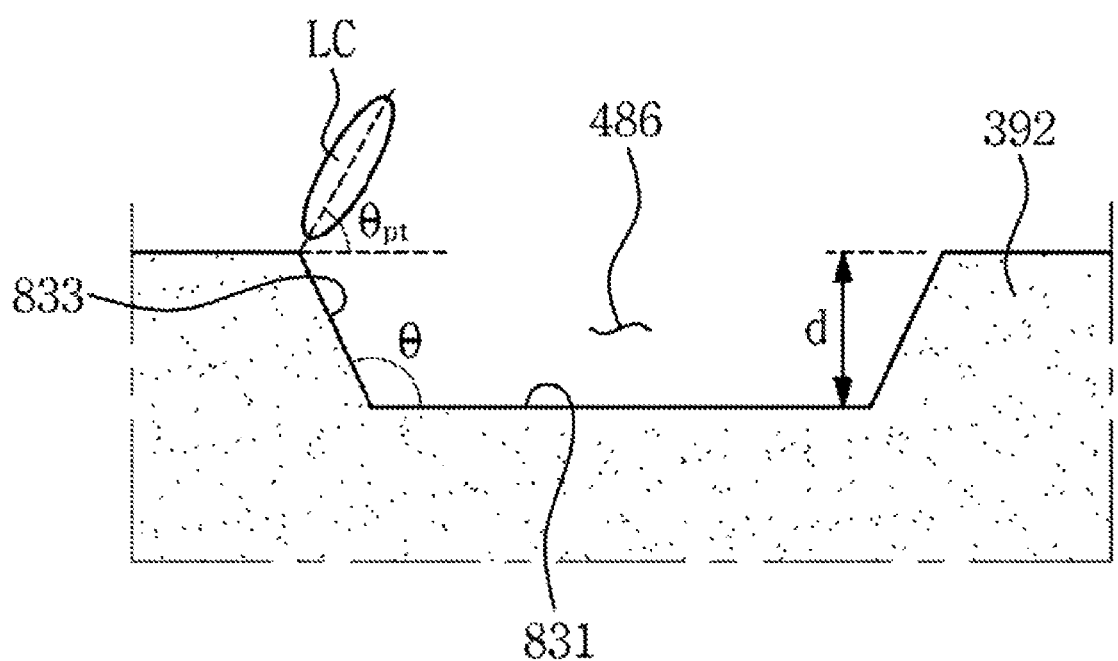
FIG. 8 is a view illustrating movement of liquid crystal molecules of a liquid crystal display device according to an embodiment of the present invention.

FIG. 8 is a view illustrating movement of liquid crystal molecules of an LCD device according to an embodiment of the present invention.

According to an embodiment of the present invention, as illustrated in FIG. 8, as a result of the presence of a groove 486 defined on an upper insulating layer 392, liquid crystal molecules LC may be tilted toward the groove 486. Accordingly, the liquid crystal molecules LC may have a pre-tilt angle θpt. As a result, the liquid crystal molecules LC disposed adjacent to a first upper sub-pixel electrode U1 may not be substantially influenced by an electric field generated by the first upper sub-pixel electrode U1. Therefore, the movement of the liquid crystal molecules LC disposed adjacent to the first upper sub-pixel electrode U1 can be properly controlled.

The upper insulating layer 392 may have a groove 486 having a depth d in the range of about 500 Å to about 1000 Å. Further, the upper insulating layer 392 may have a side surface 833 and a bottom surface 831 forming an angle θ in the range of about 90 to 130 degrees in the groove 486. Meanwhile, the upper insulating layer 392 may have a groove 486 that has a deeper depth than the groove 436 of the color filter 354.

Hereinafter, a method of manufacturing an LCD device according to an embodiment of the present invention is described below with reference to FIGS. 9A to 9K and FIGS. 10A to 10G.

FIGS. 9A to 9K and FIGS. 10A to 10G are cross-sectional views illustrating processes of manufacturing an LCD device according to an embodiment of the present invention.

Figure 9A:
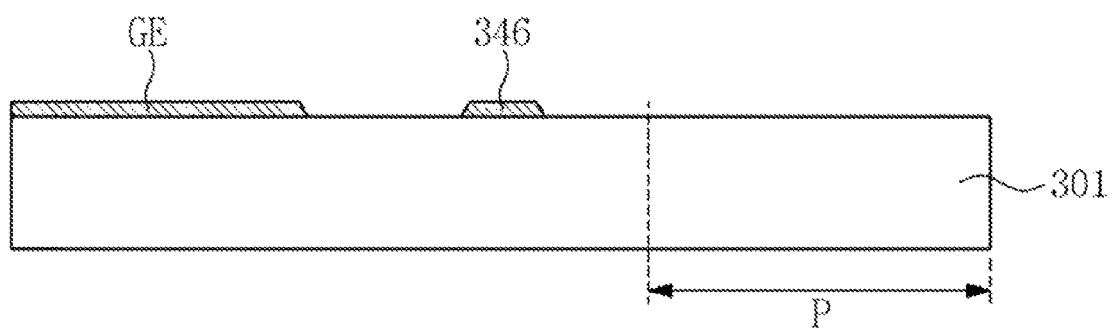
FIGS. 9A to 9K and FIGS. 10A to 10G are cross-sectional views illustrating processes of a method of manufacturing a liquid crystal display device according to an embodiment of the present invention.
Figure 10A:
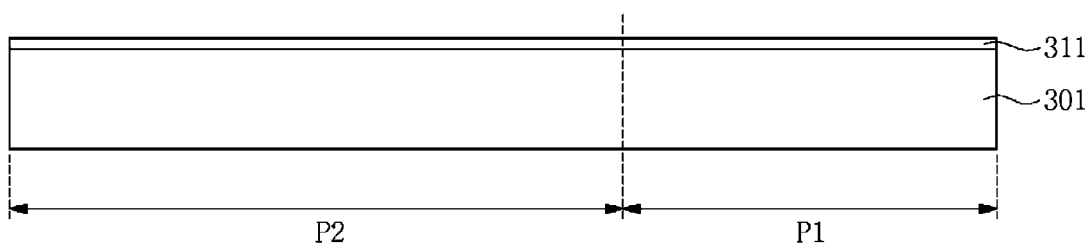

First, as illustrated in FIGS. 9A and 10A, a gate metal layer is formed on a first substrate 301 in a method of deposition such as sputtering. Next, the gate metal layer may be patterned by a photolithography process and an etching process to form a gate line GL, a gate electrode GE, and a dummy line 346 on the first substrate 301. In this case, the gate line GL, the gate electrode GE, and the dummy line 346 are formed in an area except for a pixel region P. Herein, the gate metal layer may be, for example, the above-described aluminum (Al)-based metal such as aluminum or an aluminum alloy, silver (Ag)-based metal such as silver or a silver alloy, copper (Cu)-based metal such as copper or a copper alloy, molybdenum (Mo)-based metal such as molybdenum or a molybdenum alloy. Further, the gate metal layer may be, for example, one of chromium (Cr), tantalum (Ta) and titanium (Ti).

Figure 9B:
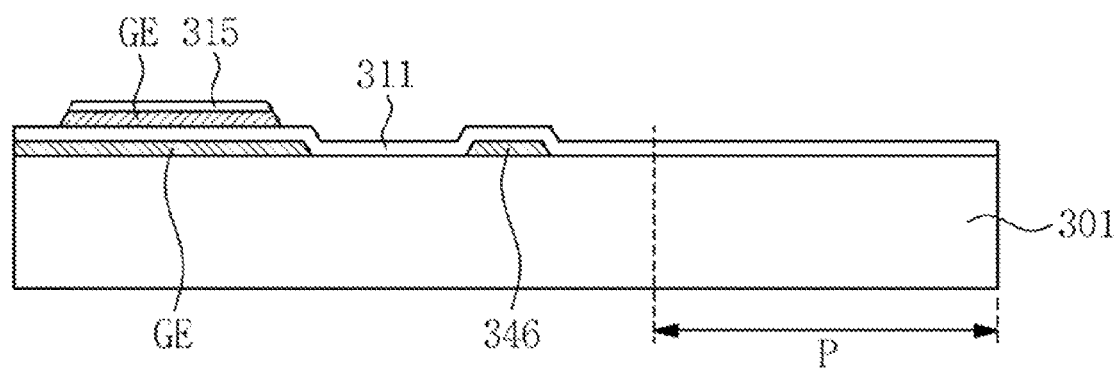
Figure 10B:
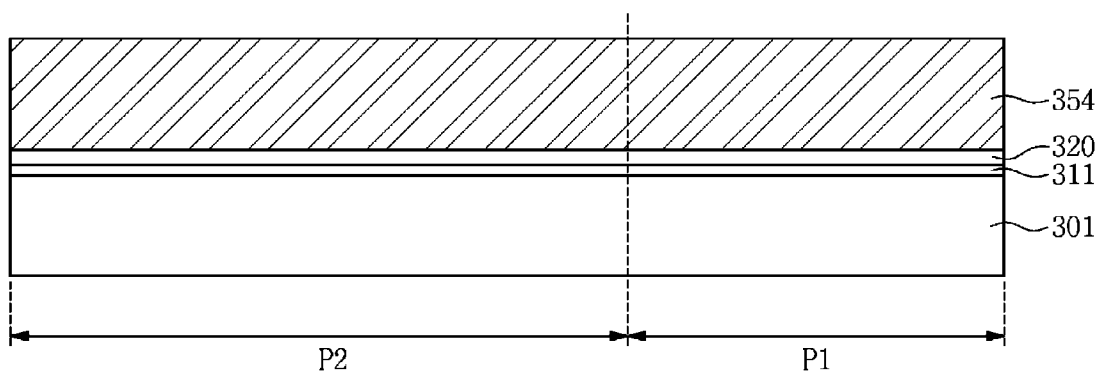

Next, as illustrated in FIGS. 9B and 10B, a gate insulating layer 311 may be formed over the entire surface of the first substrate 301 including the gate line GL, the gate electrode GE, and the dummy line 346. Then, semiconductor materials, such as intrinsic amorphous silicon, and semiconductor materials with impurities, such as amorphous silicon with impurities, are sequentially deposited on the gate insulating layer 311. Subsequently the semiconductor material and the semiconductor material with impurities are patterned by a photolithography process and an etching process to form a semiconductor layer 313 and an ohmic contact layer 315 to overlap the gate electrode GE.

Figure 9C:
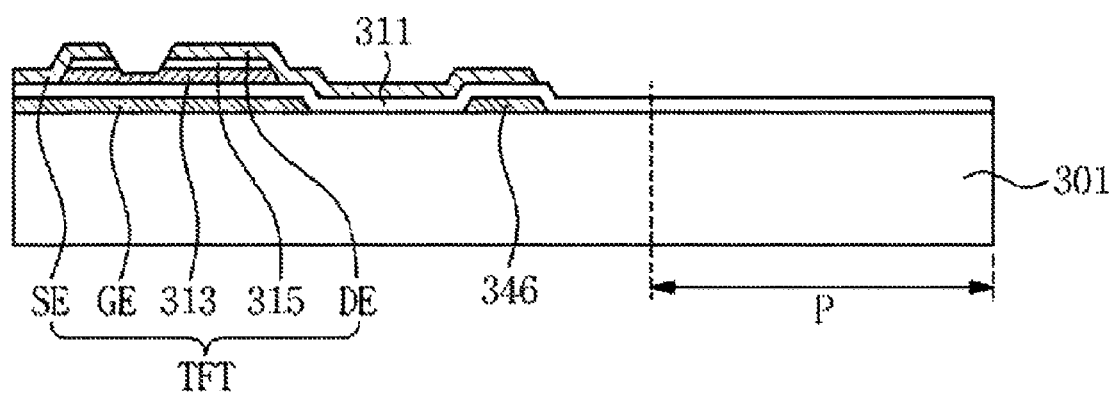

Next, as illustrated in FIG. 9C, a source metal layer may be formed over the entire surface of the first substrate 301 including the semiconductor layer 313. Then, the source metal layer may be patterned by a photolithography process and an etching process to form a source electrode SE and a drain electrode DE that overlap both sides of the semiconductor layer 313 and partially overlap the dummy line 346. In this case, the ohmic contact layer 315 disposed on a channel region of the semiconductor layer 313 is removed. Herein the source metal layer may be refractory metal, such as molybdenum, chromium, tantalum and titanium, or a metal alloy thereof.

Figure 9D:
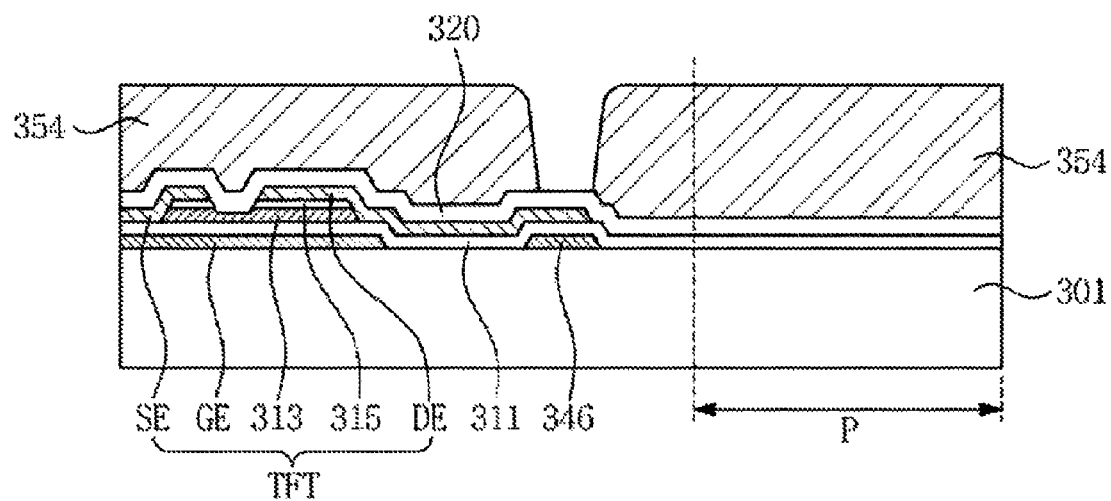

Next, as illustrated in FIGS. 9D and 10B, a protective layer 320 may be formed over the entire surface of the first substrate 301 including the source electrode SE and the drain electrode DE. Then, a photo-sensitive organic material may be formed over the entire surface of the first substrate 301 including the protective layer 320. Then, a color filter 354 may be formed in an area corresponding to the pixel region by a photolithography process and an etching process. In this case, an edge portion of the color filter 354 may be disposed on the gate line GL including the gate electrode GE, the TFT, and the data line DL. However, the color filter 354 is not formed on the drain electrode DE.

Figure 9E:
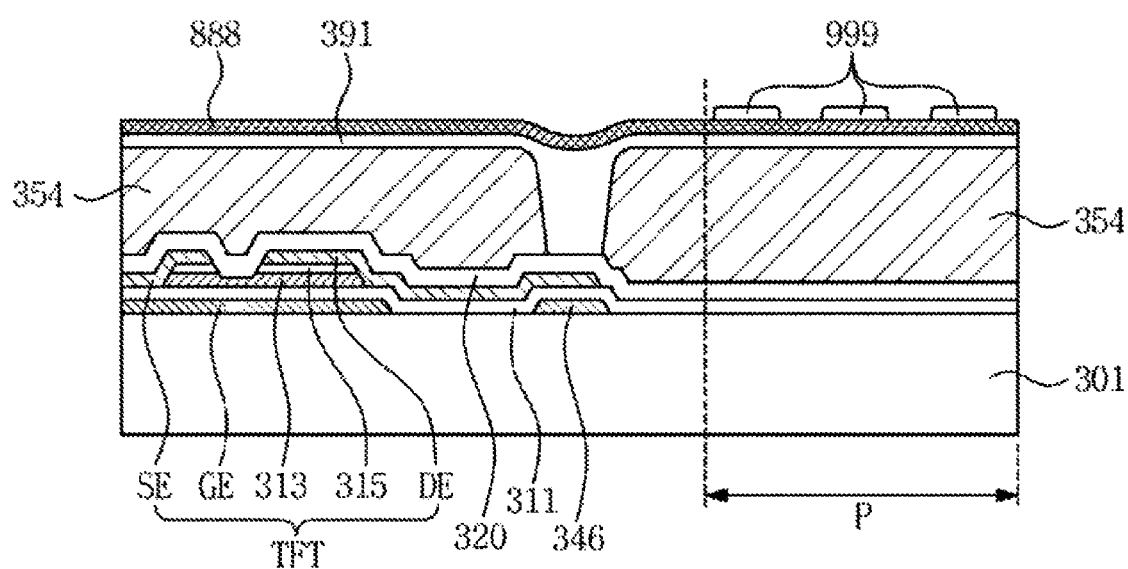
Figure 10C:
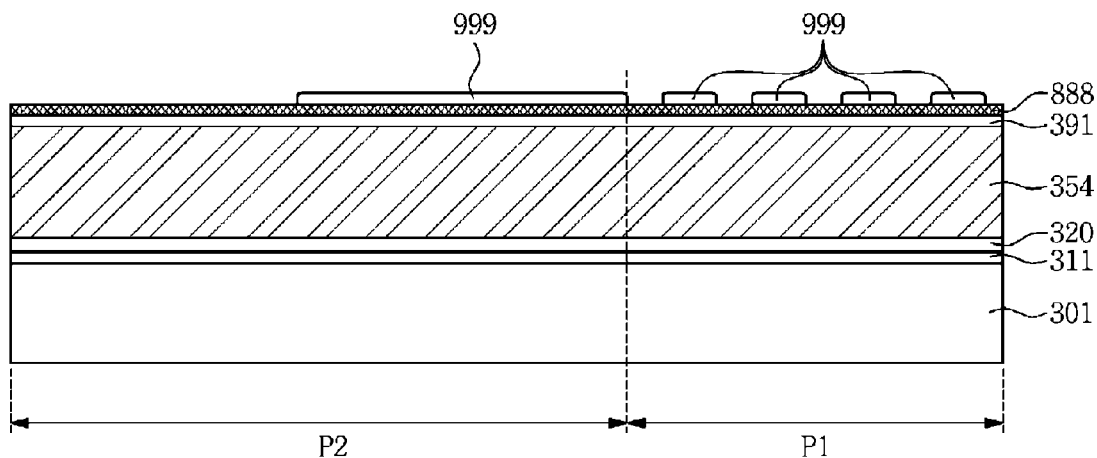

Subsequently, as illustrated in FIGS. 9E and 10C, a lower insulating layer 391, a lower pixel electrode layer 888, and a photoresist are sequentially formed over the entire surface of the first substrate 301 including the color filter 354. Then, the photoresist may be patterned by a photolithography process and an etching process, thereby forming, a photoresist pattern 999 on the lower pixel electrode layer 888.

Figure 9F:
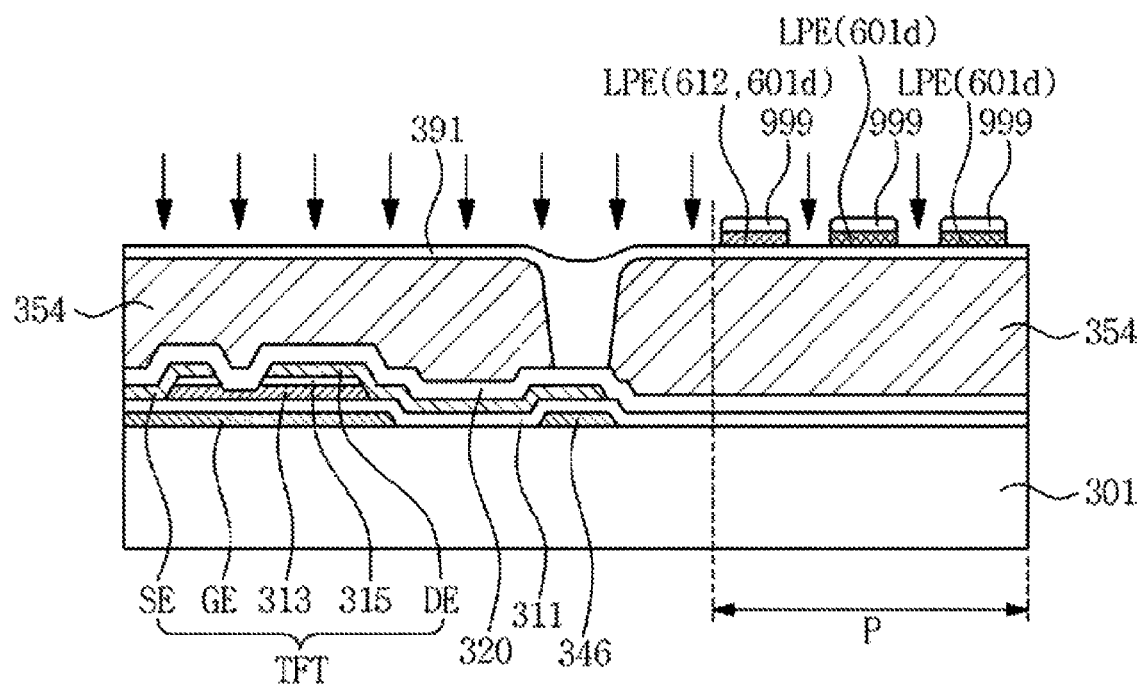
Figure 10D:
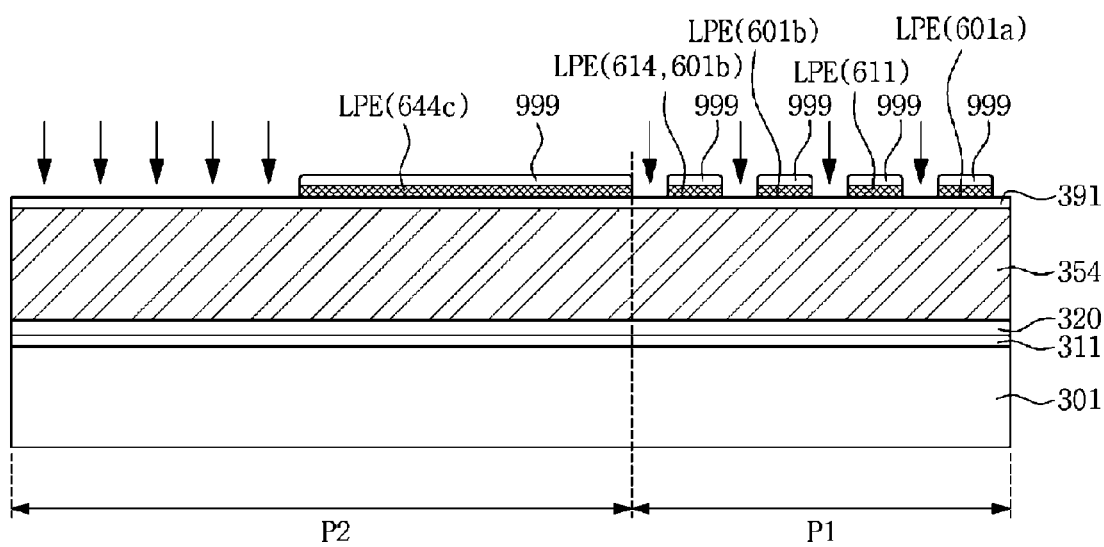

Next, as illustrated in FIGS. 9F and 10D, an etching process may be performed using the photoresist pattern 999 as a mask. Accordingly, a part of the lower pixel electrode layer 888 that is exposed by the photoresist pattern 999 is removed, thereby forming a lower pixel electrode pattern LPE in the pixel region. Herein, the lower pixel electrode layer 888 may be ITO or IZO. In this case, the ITO may be polycrystalline or monocrystalline and the IZO may also be polycrystalline or monocrystalline. Meanwhile, the lower pixel electrode pattern LPE is the same as the above-described lower pixel electrode LPE, and thus hereinafter referred to as a lower pixel electrode LPE.

Figure 9G:
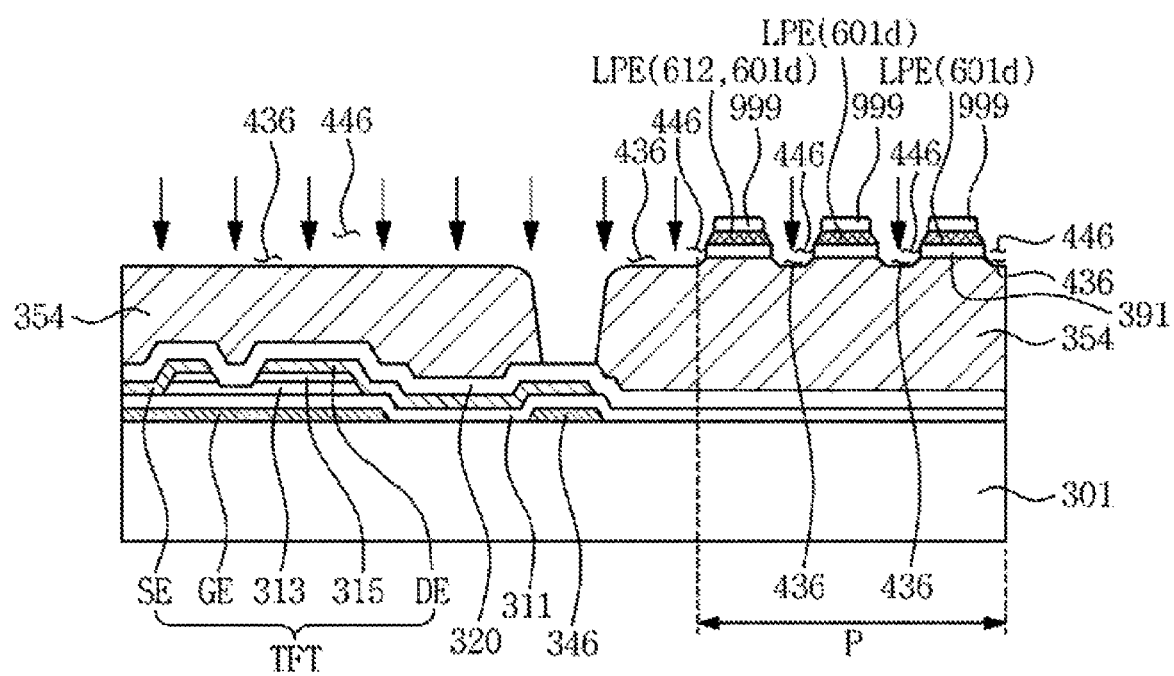
Figure 10E:
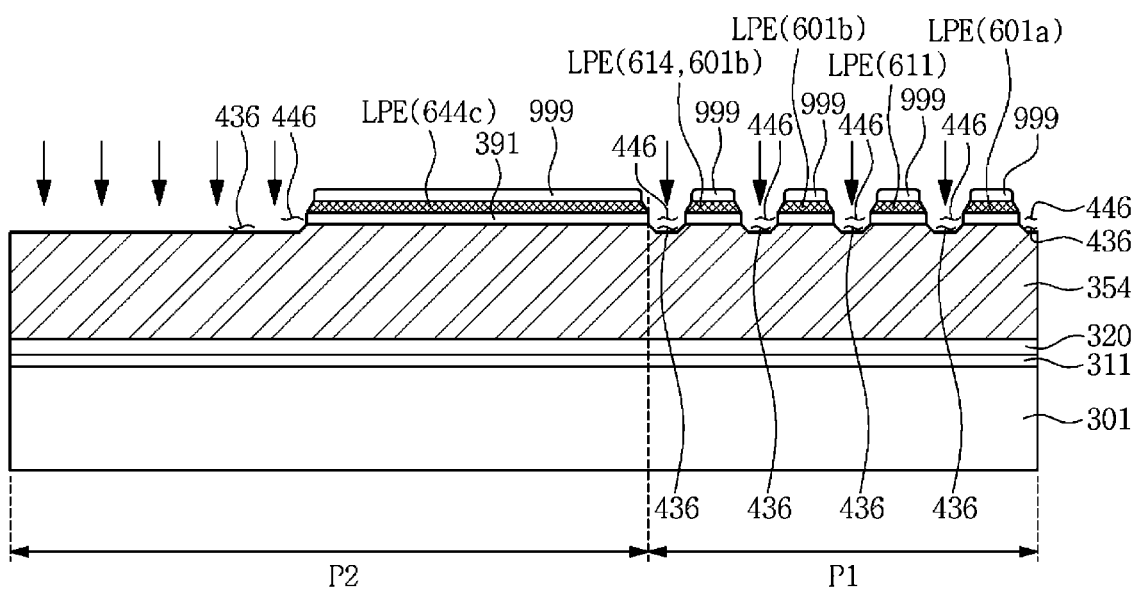

Next, as illustrated in FIGS. 9G and 10E, an etching process may be performed using the photoresist pattern 999 and the lower pixel electrode LPE as a mask. When the etching process may be performed, a dry etching method may be employed. Accordingly a hole 446 is defined on the lower insulating layer 391 exposed through the photoresist pattern 999 and the lower pixel electrode LPE. In the case where the etching process may be performed longer, a groove 436 may be further formed on a part of the color filter 354 that may be disposed under the hole 446 of the lower insulating layer 391. The groove 436 of the color filter 354 is not always necessary and may not be formed.

Figure 9H:
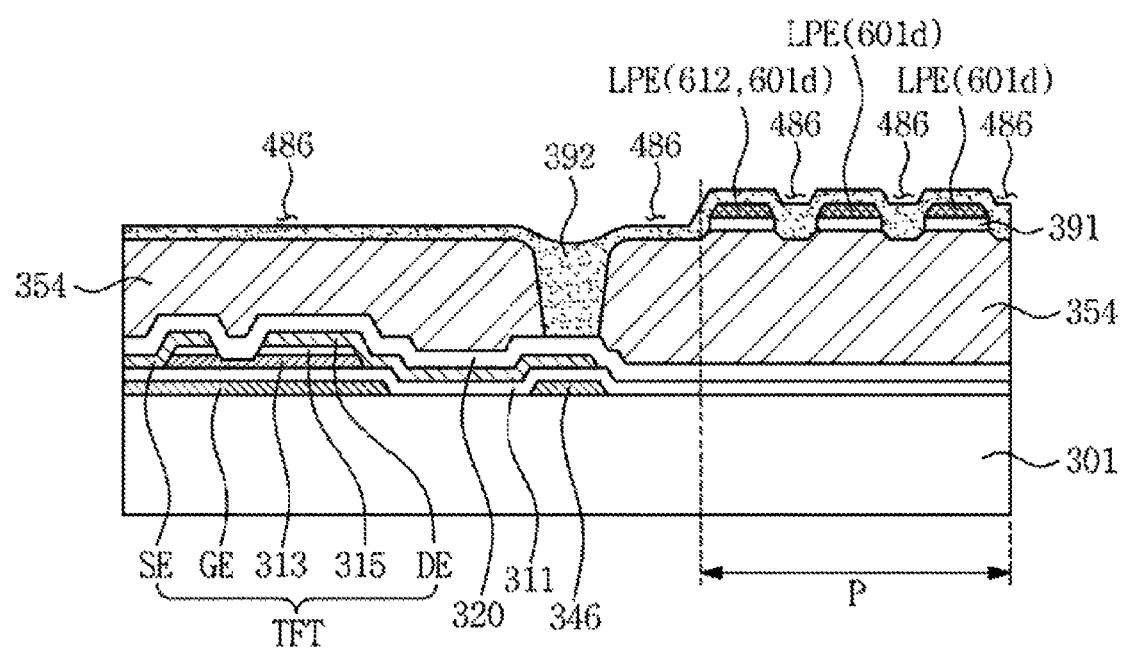
Figure 10F:
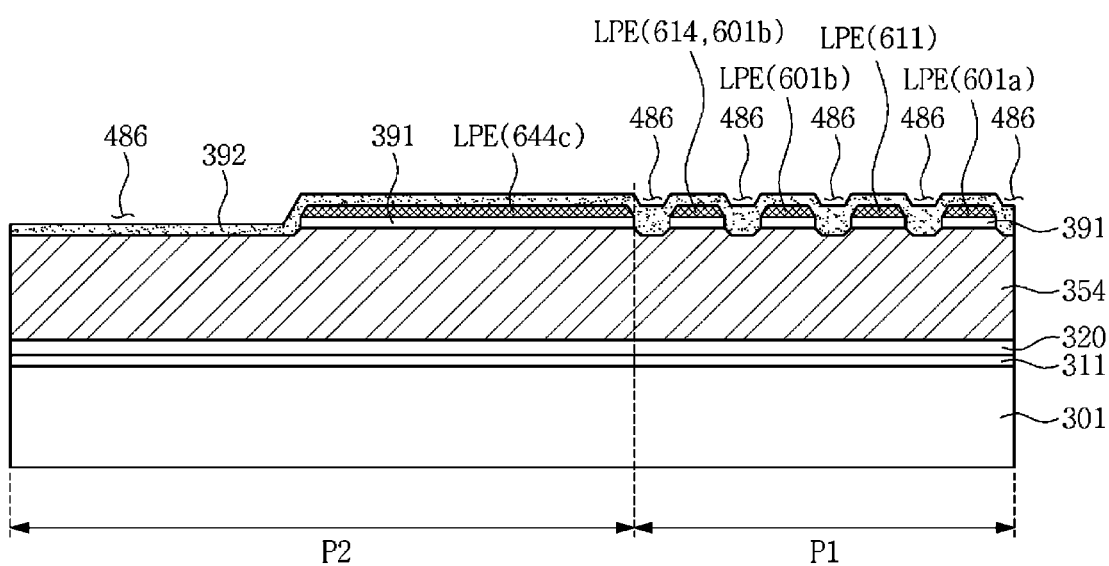

Next, as illustrated in FIGS. 9H and 10F, the photoresist pattern 999 is removed. Then, an upper insulating layer 392 may be formed over the entire surface of the first substrate 301 including the lower pixel electrode LPE. In this case, a groove 486 is defined on the upper insulating layer 392. That is, a part of the upper insulating layer 392 disposed on the hole 446 of the lower insulating layer 391 subsides, thereby forming the groove 486 thereon.

Figure 9I:
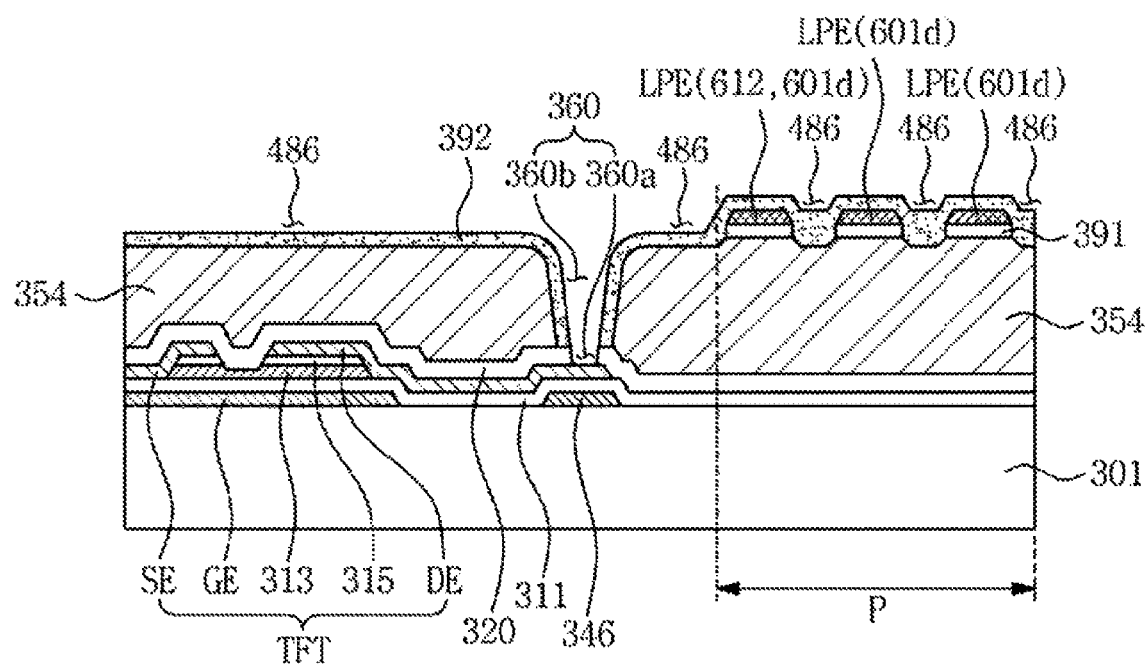
Figure 10G:
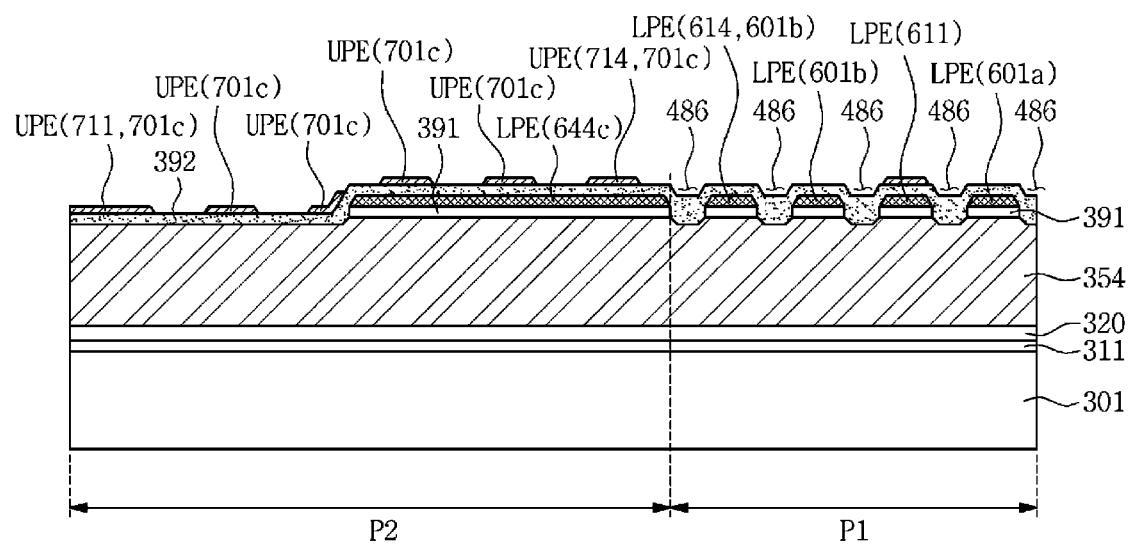

Subsequently, as illustrated in FIGS. 9I and 10G, a drain contact hole 360 may be formed extending through the protective layer 320 and the upper insulating layer 392 on the drain electrode DE. The drain contact hole 360 includes an upper penetrating hole 360b and a lower penetrating hole 360a. The drain electrode DE is exposed through the drain contact hole 360.

Figure 9J:
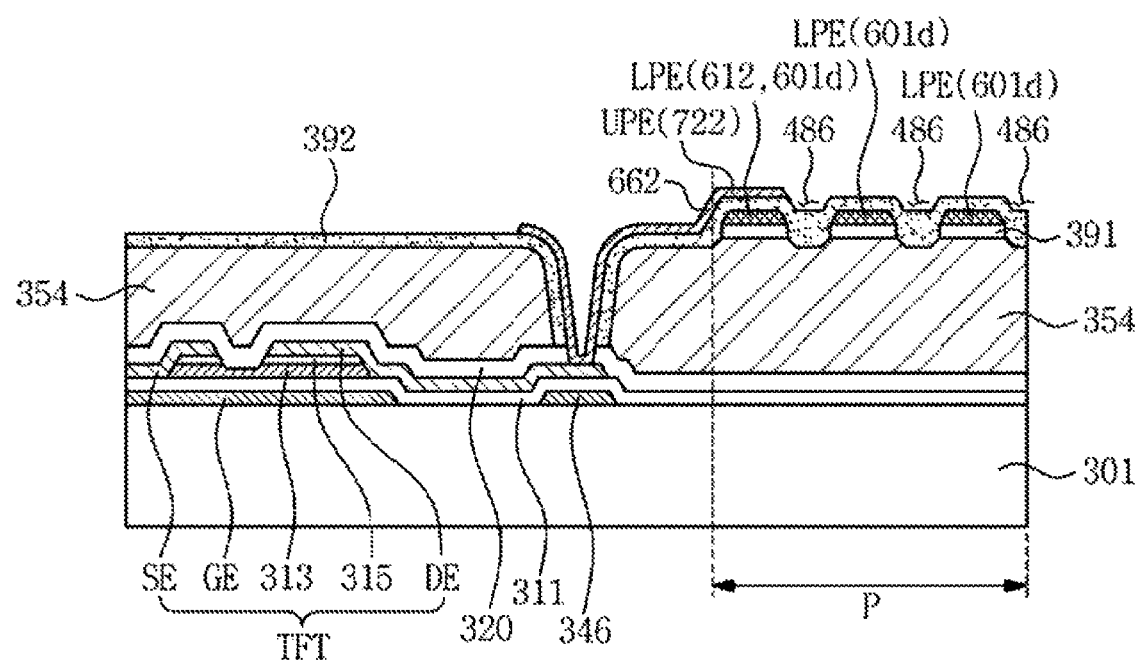

Next, as illustrated in FIG. 9J, an upper-pixel-electrode forming material may be formed over the entire surface of the first substrate 301 including the protective layer 320. Then upper pixel electrode-forming material may be patterned by a photo-lithography process and an etching process, thereby forming an upper pixel electrode UPE, which may be connected to the drain electrode DE, on the upper insulating layer 392. Herein, the upper pixel electrode-forming material may be ITO or IZO. In this case, the ITO may be polycrystalline or monocrystalline and the IZO may also be polycrystalline or monocrystalline.

Figure 9K:
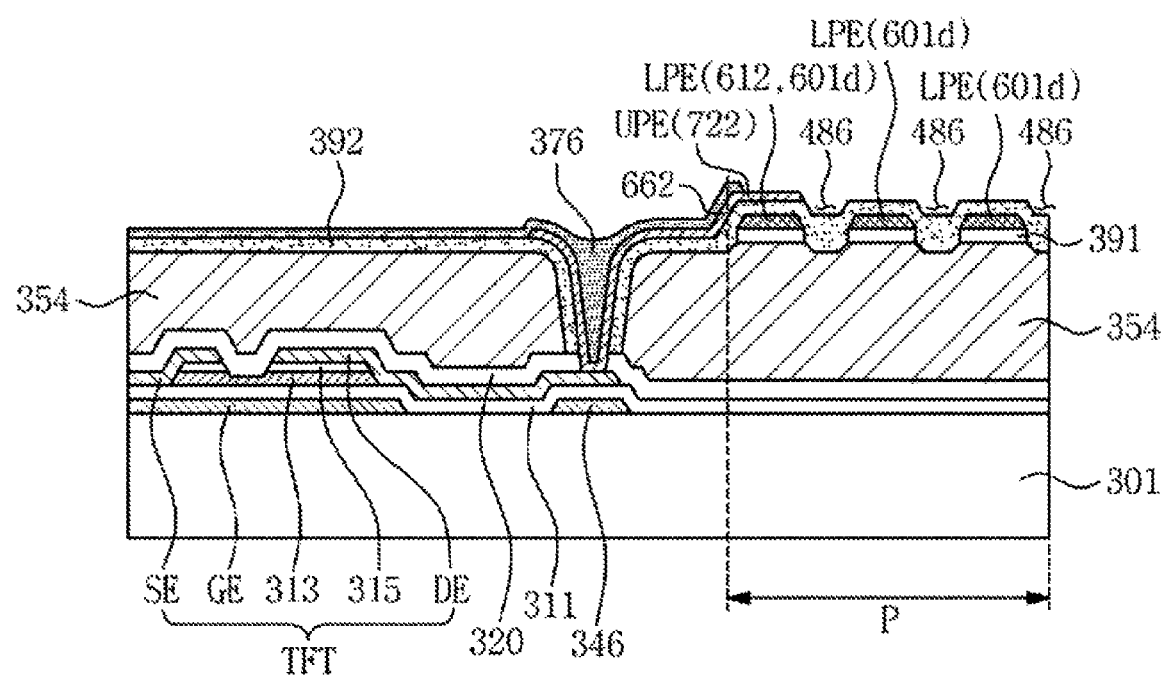

Next, as illustrated in FIG. 9K, a black matrix-forming material may be formed over the entire surface of the first substrate 301 including the upper pixel electrode UPE. Then, the black matrix-forming material may be patterned by a photolithography process and an etching process, thereby forming a black matrix 376 on the upper insulating layer 392.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A liquid crystal display device, comprising:
a first substrate;
a second substrate opposed to the first substrate;
a liquid crystal layer between the first substrate and the second substrate;
a black matrix disposed on one of the first substrate and the second substrate and configured to define a pixel region;
a lower pixel electrode on the first substrate corresponding to the pixel region;
an upper insulating layer disposed on the lower pixel electrode and having at least one groove;
an upper pixel electrode disposed on the upper insulating layer and receiving a data signal from a thin film transistor, the data signal applied from a data line;
a color filter on the first substrate; and
a lower insulating layer between the color filter and the lower pixel electrode, the lower insulating layer having at least one hole, the at least one hole corresponding to recesses in an upper major surface of the color filter that faces the second substrate, the recesses in the upper major surface of the color filter is not a through hole in the color filter.

2. The liquid crystal display device of claim 1, wherein the groove of the upper insulating layer is disposed corresponding to the hole of the lower insulating layer, the hole of the lower insulating layer not overlapping the lower pixel electrode.

3. The liquid crystal display device of claim 1, wherein the groove of the upper insulating layer has a depth in a range of about 500 Å to about 1000 Å.

4. The liquid crystal display device of claim 1, wherein the upper insulating layer has a side surface connected to a bottom surface forming an angle in a range of about 90 to about 130 degrees at a point of contact between the side surface and the bottom surface in the groove.

5. The liquid crystal display device of claim 1, the groove of the upper insulating layer not overlapping the lower pixel electrode.

6. The liquid crystal display device of claim 1, wherein a part of the upper pixel electrode overlaps the hole of the lower insulating layer.

7. The liquid crystal display device of claim 1, wherein the lower pixel electrode comprises:
a first lower sub-pixel electrode in a first sub-pixel region of the pixel region; and
a second lower sub-pixel electrode in a second sub-pixel region of the pixel region, the second lower sub-pixel electrode separated from, electrically isolated from and spaced apart from the first lower sub-pixel electrode.

8. The liquid crystal display device of claim 7, wherein the upper pixel electrode comprises:
a first upper sub-pixel electrode on the first lower sub-pixel electrode; and
a second upper sub-pixel electrode disposed on the second lower sub-pixel electrode and connected to the first upper sub-pixel electrode.

9. The liquid crystal display device of claim 8, wherein the first lower sub-pixel electrode comprises:
a cross-shaped stem electrode dividing the first sub-pixel region into a plurality of domains; and
a plurality of branch electrodes extending from the cross-shaped stem electrode into the domains.

10. The liquid crystal display device of claim 9, the first upper sub-pixel electrode being comprised of a cross-shaped stem that overlaps the cross-shaped stem electrode of the first lower sub-pixel electrode and does not overlap the branch electrodes of the first lower sub-pixel electrode.

11. The liquid crystal display device of claim 7, wherein the second upper sub-pixel electrode comprises:
a cross-shaped stem electrode dividing the second sub-pixel region into a plurality of domains; and
a branch electrode extending from the cross-shaped stem electrode to the domains.

12. The liquid crystal display device of claim 11, wherein the second lower sub-pixel electrode comprises a closed-loop shape surrounding an central open portion, the closed-loop shape includes a plurality of surface electrodes occupying only a part of each domain in the second sub-pixel region.

13. The liquid crystal display device of claim 1, being produced by a process comprising:
forming the lower insulating layer on the first substrate;
forming the lower pixel electrode layer on the lower insulating layer;
forming a photoresist pattern on the lower pixel electrode layer;

forming a lower pixel electrode pattern on a pixel region using the photoresist pattern as a mask;

forming the at least one hole in the lower insulating layer using the photoresist pattern and the lower pixel electrode pattern as a mask;

removing the photoresist pattern;

forming the upper insulating layer on the lower insulating layer and the lower pixel electrode, the groove in the upper insulating layer being arranged to correspond to an area corresponding to the hole; and forming the upper pixel electrode on the upper insulating layer.

14. The liquid crystal display device of claim 7, further comprising a common electrode arranged on the second substrate and receiving a common voltage, wherein the second lower sub-pixel electrode receiving a drop voltage from a gate driver, the drop voltage being less than the common voltage.

15. The liquid crystal display device of claim 14, wherein the first lower sub-pixel electrode maintains a floating state and is not electrically connected to anything, wherein liquid crystal molecules arranged within a first area are applied a pixel voltage that is not attenuated and is thus greatest and corresponds to the open region of the lower sub-pixel electrode, wherein liquid crystal molecules in a second area receive a pixel voltage attenuated by a first amount due to a drop voltage being applied to surface electrodes of the second lower sub-pixel electrode, and liquid crystal molecules arranged in a third area receive a pixel voltage attenuated by a second and greater amount due to a capacitance caused by the floating first lower sub-pixel electrode.

16. The liquid crystal display device of claim 1, wherein a pixel voltage corresponding to the data signal is applied to the upper pixel electrode, wherein the lower pixel electrode comprises a first lower sub-pixel electrode in a first sub-pixel region of the pixel region that maintains a floating state and is not electrically connected to anything and a second lower sub-pixel electrode in a second sub-pixel region of the pixel region that is applied a drop signal from a gate driver.

17. The liquid crystal display device of claim 7, wherein the groove of the upper insulating layer corresponding to spaces between adjoining branches of the first lower sub-pixel electrode.

18. A liquid crystal display device, comprising:
a first substrate;
a second substrate opposed to the first substrate;
a liquid crystal layer between the first substrate and the second substrate;
a black matrix disposed on one of the first substrate and the second substrate and configured to define a pixel region;
a lower pixel electrode on the first substrate corresponding to the pixel region, the lower pixel electrode comprising a first lower sub-pixel electrode in a first sub-pixel region of the pixel region and a second lower sub-pixel electrode in a second sub-pixel region of the pixel region, the second lower sub-pixel electrode separated from, electrically isolated from, and spaced apart from the first lower sub-pixel electrode, the first lower sub-pixel electrode comprising a cross-shaped stem electrode dividing the first sub-pixel region into a plurality of domains and a plurality of branch electrodes extending from the cross-shaped stem electrode into the domains;
an upper insulating layer disposed on the lower pixel electrode and having at least one groove;
an upper pixel electrode disposed on the upper insulating layer and receiving a data signal from a thin film transistor, the data signal applied from a data line, the upper pixel electrode comprising a first upper sub-pixel electrode disposed on the first lower sub-pixel electrode and a second upper sub-pixel electrode disposed on the second lower sub-pixel electrode and connected to the first upper sub-pixel electrode;
a color filter arranged on the first substrate and having recesses on an upper surface thereof that faces the second substrate; and
a lower insulating layer arranged between the color filter and the lower pixel electrode, the lower insulating layer having at least one hole corresponding to the groove of the upper insulating layer, the recess in the upper surface of the color filter and a gap between adjoining branches of the first lower sub-pixel electrode.

19. A liquid crystal display device, comprising:
a first substrate;
a second substrate opposed to the first substrate;
a liquid crystal layer between the first substrate and the second substrate;
a black matrix disposed on one of the first substrate and the second substrate and configured to define a pixel region;
a lower pixel electrode on the first substrate corresponding to the pixel region;
an upper insulating layer disposed on the lower pixel electrode and having at least one groove;
an upper pixel electrode disposed on the upper insulating layer and receiving a data signal from a thin film transistor, the data signal applied from a data line; and
a color filter disposed on the first substrate and having at least one recess disposed corresponding to the at least one groove of the upper insulating layer,
wherein the at least one recess is disposed at boundary surfaces between the color filter and the upper insulating layer.

* * * * *